US011554943B2

(12) United States Patent
Schwalbach et al.

(10) Patent No.: US 11,554,943 B2
(45) Date of Patent: Jan. 17, 2023

(54) MATERIAL TRANSPORT CART

(71) Applicant: MILWAUKEE ELECTRIC TOOL CORPORATION, Brookfield, WI (US)

(72) Inventors: David M. Schwalbach, Milwaukee, WI (US); Christina Prestidge-Kadrlik, Milwaukee, WI (US); Paul Rossetto, Milwaukee, WI (US); Logan M. Hietpas, Shorewood, WI (US); Matt Thurin, Wauwatosa, WI (US); Kathleen M. Keegan, Milwaukee, WI (US); James Wekwert, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 707 days.

(21) Appl. No.: 16/528,765

(22) Filed: Aug. 1, 2019

(65) Prior Publication Data
US 2020/0048058 A1    Feb. 13, 2020

Related U.S. Application Data

(60) Provisional application No. 62/715,661, filed on Aug. 7, 2018.

(51) Int. Cl.
*B66F 9/065* (2006.01)
*B62B 5/00* (2006.01)
(Continued)

(52) U.S. Cl.
CPC .............. *B66F 9/065* (2013.01); *B62B 3/022* (2013.01); *B62B 3/102* (2013.01); *B62B 5/0053* (2013.01);
(Continued)

(58) Field of Classification Search
CPC ..... B62B 2205/30; B62B 3/102; B62B 5/062; B62B 5/064; B62B 5/067; B60P 1/4457
See application file for complete search history.

(56) References Cited

U.S. PATENT DOCUMENTS 2,536,561 A * 1/1951 Mickam .................. B62B 3/104
                                              280/79.6
3,125,350 A   3/1964 Thiermann
(Continued)

FOREIGN PATENT DOCUMENTS

CN      203063990 U    7/2013
CN      204701648 U    10/2015
(Continued)

OTHER PUBLICATIONS

International Search Report and Written Opinion for Application No. PCT/US2019/044576 dated Nov. 20, 2019 (10 pages).
(Continued)

*Primary Examiner* — Mark C Hageman
(74) *Attorney, Agent, or Firm* — Michael Best & Friedrich LLP

(57) ABSTRACT

A material transport cart includes a cart body, a material support body coupled to the cart body, a wheel coupled to the cart body, a motor operable to drive the wheel, and a powered lift assembly. The powered lift assembly is coupled to the cart body and to the material support body. The powered lift assembly is operable to lift the material support body relative to the cart body. A removable battery is electrically coupled to and operable to supply power to both the motor and the powered lift assembly.

8 Claims, 20 Drawing Sheets

(51) Int. Cl.
*B62B 3/10* (2006.01)
*B62B 5/06* (2006.01)
*B66F 9/22* (2006.01)
*B66F 9/075* (2006.01)
*B62B 3/02* (2006.01)
*B66F 9/12* (2006.01)

(52) U.S. Cl.
CPC .......... *B62B 5/063* (2013.01); *B66F 9/07572* (2013.01); *B66F 9/122* (2013.01); *B66F 9/22* (2013.01); *B62B 5/0069* (2013.01); *B62B 2202/12* (2013.01); *B62B 2203/10* (2013.01); *B62B 2203/20* (2013.01); *B62B 2206/06* (2013.01)

(56) References Cited

U.S. PATENT DOCUMENTS

| | | | |
|---|---|---|---|
| 3,224,612 | A | 12/1965 | Olson |
| 3,525,099 | A | 8/1970 | Fuhrmann |
| 3,702,139 | A | 11/1972 | Chaffin |
| 3,827,840 | A | 8/1974 | Kistler |
| 4,049,083 | A | 9/1977 | Garvey |
| 4,084,706 | A | 4/1978 | Russell |
| 5,110,147 | A | 5/1992 | Gershman |
| 5,123,666 | A | 6/1992 | Moore |
| 5,562,400 | A | 10/1996 | Travis |
| 6,042,329 | A | 3/2000 | Marquez et al. |
| 6,302,414 | B1 | 10/2001 | Berthiaume et al. |
| 6,309,168 | B1 | 10/2001 | Holmes |
| 6,390,213 | B1 | 5/2002 | Bleicher |
| 6,758,482 | B2 | 7/2004 | Stallbaumer |
| 6,848,879 | B2 | 2/2005 | Odorizzi |
| 7,145,298 | B1 | 12/2006 | Garner |
| 7,163,213 | B2 | 1/2007 | Chambers |
| 7,168,514 | B2 | 1/2007 | Newell |
| 7,210,545 | B1 | 5/2007 | Waid |
| 7,554,278 | B2 | 6/2009 | Wegner-Donnelly et al. |
| 7,600,765 | B2 | 10/2009 | Tsai |
| 7,762,363 | B1 | 7/2010 | Hirschfeld |
| 7,775,306 | B1 | 8/2010 | Adkins |
| 7,845,441 | B2 | 12/2010 | Chambers |
| 8,096,745 | B2 | 1/2012 | Lamothe |
| 8,240,683 | B1 | 8/2012 | Haslup, Sr. |
| 8,327,963 | B1 | 12/2012 | Faulkingham |
| 8,413,824 | B2 | 4/2013 | Cabassa |
| 8,453,771 | B1 | 6/2013 | Hirschfeld |
| 8,511,406 | B2 | 8/2013 | Anasiewicz |
| 8,596,389 | B2 | 12/2013 | Anasiewicz |
| 9,132,848 | B2 * | 9/2015 | Sekine .................. B62B 5/0069 |
| 9,205,752 | B1 | 12/2015 | Bentz |
| 9,598,272 | B2 | 3/2017 | Ivanchenko |
| 9,708,166 | B2 | 7/2017 | Messmann et al. |
| 9,796,402 | B1 | 10/2017 | Suarez |
| 9,908,570 | B1 | 3/2018 | Mayers |
| 9,925,999 | B2 | 3/2018 | Young et al. |
| 9,956,976 | B1 | 5/2018 | Akre |
| 2002/0084119 | A1 | 7/2002 | Brabetz et al. |
| 2005/0006155 | A1 | 1/2005 | Lenkman |
| 2006/0070780 | A1 | 4/2006 | Lin |
| 2008/0041644 | A1 | 2/2008 | Tudek |
| 2008/0197608 | A1 | 8/2008 | Dixon |
| 2009/0020369 | A1 | 1/2009 | Warachka |
| 2009/0078483 | A1 | 3/2009 | Grothkopp et al. |
| 2010/0284772 | A1 | 11/2010 | William |
| 2012/0012409 | A1 | 1/2012 | Turner et al. |
| 2014/0265254 | A1 | 9/2014 | Sekine et al. |
| 2016/0001828 | A1 | 1/2016 | Cates |
| 2017/0129522 | A1 | 5/2017 | Lee et al. |

FOREIGN PATENT DOCUMENTS

| | | |
|---|---|---|
| CN | 105774871 A | 7/2016 |
| CN | 205440468 U | 8/2016 |
| CN | 106800034 A | 6/2017 |
| CN | 107364477 A | 11/2017 |
| CN | 207328534 U | 5/2018 |
| CN | 207345896 U | 5/2018 |
| DE | 1264970 B | 3/1968 |
| DE | 29510395 A1 | 11/1995 |
| DE | 19927418 A1 | 1/2001 |
| DE | 102013008020 A1 | 11/2014 |
| DE | 102015114411 A1 | 3/2017 |
| EP | 1114763 A1 | 7/2001 |
| EP | 1640255 A1 | 3/2006 |
| EP | 1331133 B1 | 12/2006 |
| EP | 2085288 B1 | 8/2009 |
| EP | 2239182 A1 | 10/2010 |
| EP | 3031334 A1 | 6/2016 |
| JP | 2010000988 A | 1/2010 |
| KR | 101465627 B1 | 11/2014 |
| WO | WO 2015086373 A1 | 6/2015 |
| WO | WO 2017176202 A1 | 10/2017 |

OTHER PUBLICATIONS

Extended European Search Report for Application No. 19847881.0 dated Jul. 6, 2022 (8 pages).

* cited by examiner

MATERIAL TRANSPORT CART

CROSS-REFERENCE TO RELATED APPLICATIONS

This application claims the benefit of U.S. Provisional Patent Application No. 62/715,661, filed Aug. 7, 2018, the entire contents of which are hereby incorporated by reference.

FIELD

The present disclosure generally relates to cart and, more particularly, to material transport carts.

SUMMARY

In one aspect, the disclosure relates to a material transport cart including a cart body, a material support body coupled to the cart body, a wheel coupled to the material support body, a motor operable to drive the wheel, and a powered lift assembly. The powered lift assembly is coupled to the cart body. The powered lift assembly includes a base member to engage a ground surface. The powered lift assembly is operable to lift the cart body relative to the base member. A removable battery is electrically coupled to and operable to supply power to both the motor and the powered lift assembly.

In another aspect, the disclosure relates to a material transport cart including a cart body, a material support body coupled to the cart body, a wheel coupled to the cart body, a motor operable to drive the wheel, and a powered lift assembly. The powered lift assembly is coupled to the cart body and to the material support body. The powered lift assembly is operable to lift the material support body relative to the cart body. A removable battery is electrically coupled to and operable to supply power to both the motor and the powered lift assembly In another aspect, the disclosure relates to a material transport cart including a cart body, a wheel coupled to the cart body, a motor operable to drive the wheel, a powered lift assembly, and an attachment. The powered lift assembly is coupled to the cart body and includes an attachment receiving portion translatable relative to the cart body. The attachment is removably connected to the attachment receiving portion of the powered lift assembly. A removable battery is electrically coupled to and operable to supply power to both the motor and the powered lift assembly In another aspect, a material transport cart may generally include a frame, a wheel supporting the frame for movement over ground, a material support body providing a support surface, and a material retaining member operable to retain material on the support surface, the material retaining member being adjustable between a storage position, in which the material retaining member does not extend above the support surface, and a retaining position, in which the material retaining member extends above the support surface.

In another aspect, the material retaining member may be pivotable between the storage position and the retaining position. A first material retaining member may be positioned along one side of the support surface, and a second material retaining member may be positioned along an opposite side of the support surface. The cart may further include a user interface console, and a first support and a second support operable to support the console, the first support and the second support being positioned proximate respective opposite sides of the support surface.

In another aspect, a material transport cart may generally include a frame, a wheel supporting the frame for movement over ground, a motor operable to drive the wheel, a material support body providing a support surface, and a powered lift mechanism operable to lift the material support body relative to the frame. In some embodiments, the lift mechanism may include a scissor lift.

In another aspect, a material transport cart may generally include a first tine; a second tine spaced apart from the first tine, an intermediate space being defined between the first tine and the second tine; and a bed assembly disposable between the first tine and the second tine, the bed assembly being adjustable between a collapsed mode, in which the bed assembly has a reduced size, and an expanded mode, in which the bed assembly occupies a majority of the intermediate space.

In another aspect, the collapsible bed may be in a folded configuration in the collapsed mode and unfolds to the expanded mode. In other embodiments, the collapsible bed may be in a nested configuration in the collapsed mode.

In another aspect, a material transport cart may generally include a material support body; a first wheel connected to the material support body; and a second wheel connected to the material support body. At least one of the first wheel and the second wheel may be adjustable relative to the material support body between a first wheel mode, in which only the first wheel is utilized to move the material transport cart, and, and a second wheel mode, in which only the second wheel is utilized to move the material transport cart.

In another aspect, the first wheel may rotate about a first axis, and the second wheel may rotate about a second axis, the first axis and second axis extending in different directions. The first axis and second axis may be substantially perpendicular to each other.

In another aspect, the cart may further include a first wheel frame pivotably connected to the material support body and to the first wheel. A second wheel frame may be connected (e.g., pivotably connected) to the first wheel frame and to the second wheel. The first wheel and the second wheel may include wheels of different types.

In another aspect, a material transport cart may generally include a material support body providing a material support surface; at least one material containment barrier connected to the material support body, the material containment barrier being adjustable between a storage position, in which the at least one material containment barrier does not extend beyond the material support surface, and a containment position, in which the at least one material containment barrier extends beyond the material support surface.

In another aspect, the at least one material containment barrier may be disposed below the material support surface in the storage position. In the storage position, the at least one material containment barrier may be substantially flush with the material support surface. The material support body may define a recess, and, in the storage position, the at least one material containment barrier may be disposed in the recess. The at least one material containment barrier may be pivotably connected to the material support body.

In another aspect, a material transport cart may generally include a cart chassis; a lift assembly connected to the cart chassis; and a material support body connected to the lift assembly, the material support body being adjustable relative to the cart chassis between a lowered position and an elevated position, the material support body including a first material support body section and a second material support body section hingedly connected to the first material support body section.

In another aspect, the material support body may provide a material support surface, and the first material support body section and the second material support body section may hingedly move relative to each other to adjust the material support surface between a flatbed mode and a material containment mode. In the material containment mode, the material support surface may be generally concave (e.g., generally V-shaped).

In another aspect, a material transport cart may generally include a cart chassis; a material support body movable in a generally vertical lifting direction relative to the cart chassis, the material support body defining a longitudinal centerline and having a user end, a longitudinal plane being coplanar with the longitudinal centerline of the material support body, parallel to the lifting direction, and extending beyond the user end of the material support body; a first mount member connected to the cart chassis; and a user interface console connected to the first mount member, the user interface console being adjustable between a transport mode, in which the user interface console intersects longitudinal plane, and a lift mode, in which the user interface console no longer intersects the longitudinal plane.

In another aspect, the user interface console may be pivotably connected to the first mount member. A second mount member may be connected to the cart chassis, and the user interface console may be removably connected to the second mount member such that the user interface console is connected to the second mount member in the transport mode and is not connected to the second mount member in the lift mode. The user interface console may be pivotable such that, in the lift mode, the user interface console no longer intersects the box defined parallel to the longitudinal centerline and terminating up to the first and second mounting members of the interface console (e.g., the user interface console may be pivoted approximately ninety degrees between the transport mode and the lift mode).

In another aspect, a material transport cart may generally include a cart body; a lifting arm translatable relative to the cart body, the lifting arm including an attachment receiving portion; and a tine attachment removably connected to the attachment receiving portion of the lifting arm.

In another aspect, the cart may also include a wheel frame assembly and a wheel supported by the wheel frame assembly. The wheel frame assembly may be translatable relative to the cart body. In another aspect, the wheels may translate longitudinally relative to the cart body to widen and narrow a wheel base of the cart.

In another aspect, the tine attachment may define a slot, and the attachment receiving portion of the lifting arm may occupy the slot when the tine attachment is connected to the lifting arm. The tine attachment may include two tines spaced apart from one another or only a single tine. Tine attachment may contact the cart body to prevent pivoting movement of the tine attachment about the attachment receiving portion toward the cart body.

Other independent aspects of the disclosure may become apparent by consideration of the detailed description and accompanying drawings.

DETAILED DESCRIPTION

Figure 1:
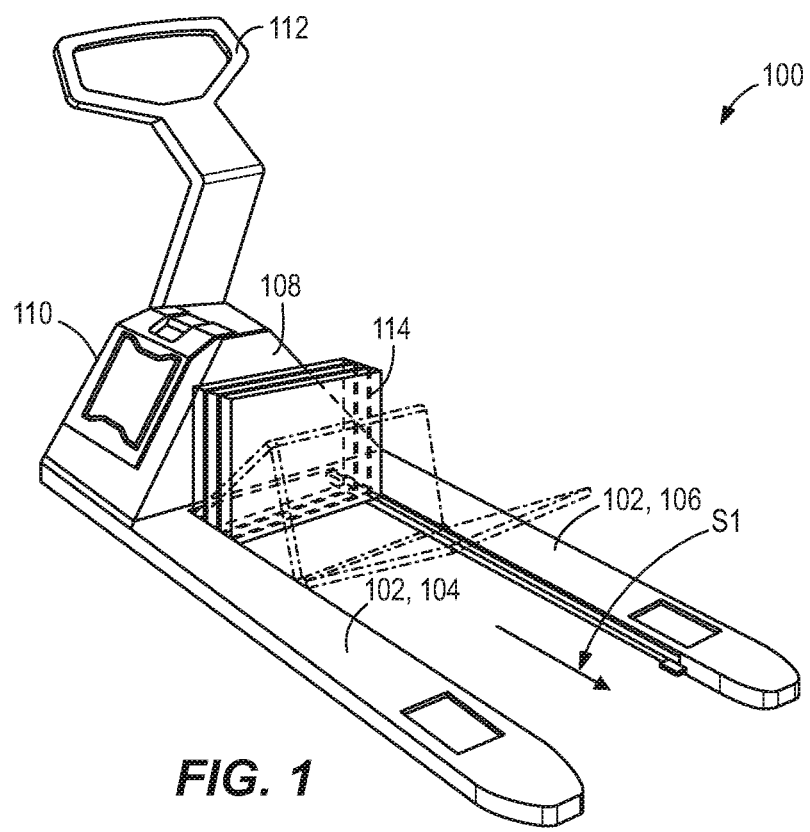
FIG. 1 is a perspective view of a material transport cart.

Before any independent embodiments of the disclosure are explained in detail, it is to be understood that the disclosure is not limited in its application to the details of construction and the arrangement of components set forth in the following description or illustrated in the accompanying drawings. The disclosure is capable of other independent embodiments and of being practiced or of being carried out in various ways. Also, it is to be understood that the phraseology and terminology used herein are for the purpose of description and should not be regarded as limiting.

The use of "including," "comprising," "having," and variations thereof herein are meant to encompass the items listed thereafter and equivalents thereof, as well as additional items. Unless specified or limited otherwise, the terms "mounted," "connected," "supported," "coupled," and variations thereof are used broadly and encompass both direct and indirect relationships.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Various embodiments of carts are illustrated in the drawings. In illustrated embodiments, the carts include material transport carts. In other embodiments (not shown), the carts may include other mobile devices, such as, for example, wagons, wheelbarrows, other vehicles, etc., to perform various tasks (e.g., transport material, products, personnel, etc.). The cart may include one or more wheels or other mobile arrangement (e.g., a track). The cart may be powered for movement over ground (e.g., different types of terrain (inclines, declines, small steps), debris and gaps on a worksite), for example, by an electric motor (e.g., powered by DC (a battery) or AC (corded)), an engine, a hydraulic motor, etc.

In embodiments including a battery, the battery (or batteries) may include one or more rechargeable battery packs. The battery pack may be removably attachable to another electrical device, such as a battery charger for charging, to other battery-powered devices, aside from the carts described herein and including hand-held and non-handheld devices, to power such devices. For example, the battery pack may also be operable to supply power to tools, such as, for example, power tools (e.g., drills, drivers, saws, nailers, grinders, etc.), outdoor tools (e.g., trimmers, pole saws, blowers, etc.), other electrical devices (e.g., other motorized devices (for example, vehicles, self-propelled tools, lifting devices, pumps, etc.), non-motorized devices (for example, lights, power adapters, power stations, etc.), or the like.

FIGS. 1-6 illustrate one embodiment of a cart, such as a material transport cart 100. The illustrated cart 100 includes a material support body 102 with spaced apart first and second tines 104, 106 defining an intermediate space S1. The support body 102 (e.g., the tines 104, 106) is connected to a cart body 108, and the support body 102 and the cart body 108 may be formed as a unitary and integral piece, as separate and fixedly or removably mounted components, or in any other appropriate configuration.

The cart body 108 houses components of the cart 100 including, but not limited to, a motor, control circuitry, memory, a power source (e.g., a battery pack 110), etc. The power source may be removable, as illustrated, or permanently affixed to the cart 100. A handle 112 is connected to the cart body 108 to allow a user to control movement of the cart 100. The handle 112 may be non-movably fixed to the cart body 108 or movable (e.g., pivotable about one or more axes) relative to the cart body 108.

In the illustrated embodiment, the power source includes a removable, rechargeable battery pack 110. A similar battery pack is described and illustrated in U.S. patent application Ser. No. 16/025,491, filed Jul. 2, 2018, the entire contents of which is hereby incorporated by reference.

In illustrated embodiments, the battery pack 110 may be used to power various electrical devices including hand-held devices (i.e., devices configured to be supported by an operator during use) and non-hand-held devices (i.e., devices supported on a work surface or support rather than by the operator during use). Such devices include motorized power tools (e.g., a drill, an impact driver, an impact wrench, a rotary hammer, a hammer drill, a saw (a circular saw, a cut-off saw, a reciprocating saw, a miter saw, a table saw, etc.), a core drill, a breaker, a demolition hammer, a compressor, a pump, etc.), outdoor tools (e.g., a chain saw, a string trimmer, a hedge trimmer, a blower, a lawn mower, etc.), drain cleaning and plumbing tools, construction tools, concrete tools, other motorized devices (e.g., vehicles, utility carts (such as the cart 100), wheeled and/or self-propelled tools, etc.), etc. and non-motorized electrical devices (e.g., a power supply, a light, an AC/DC adapter, a generator, etc.).

The battery pack 110 may include one or more cell strings, each having a number (e.g., 5, 10, 20, etc.) of battery cells connected in series to provide a desired discharge output (e.g., nominal voltage (e.g., 20 V, 40 V, 60 V, 80 V, 120 V) and current capacity). Accordingly, the battery pack 110 may include "20S1P", "20S2P", etc., configurations. In other embodiments, other combinations of battery cells are also possible.

Each battery cell may have a nominal voltage between 3 V and 5 V and may have a nominal capacity between 3 Ah and 5 Ah. The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

Figure 2:
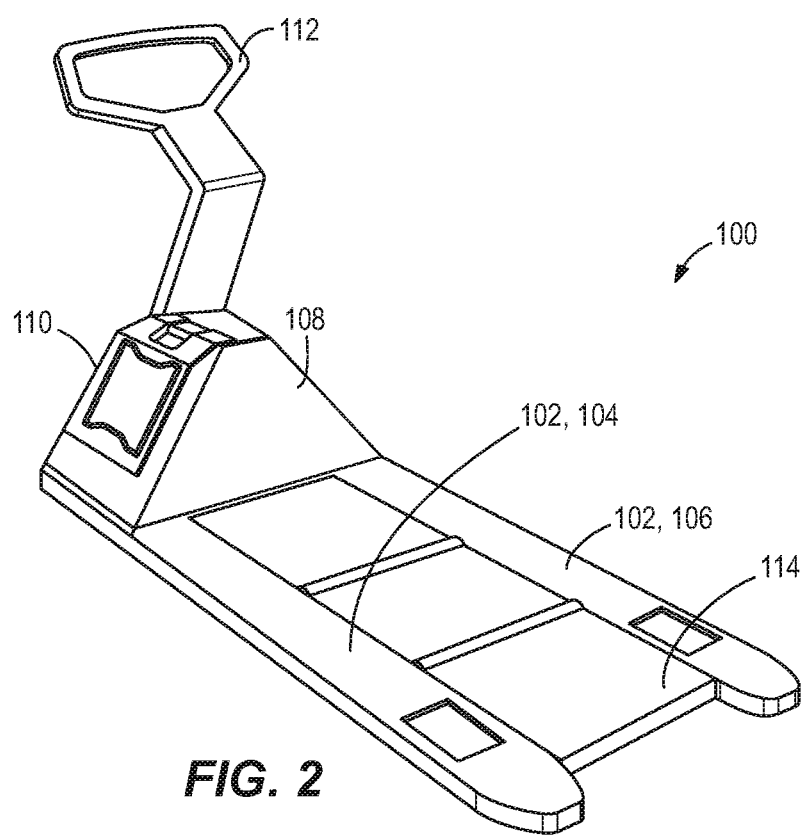
FIG. 2 is a perspective view of the material transport cart of FIG. 1, illustrating with the bed assembly in an expanded mode.

As shown in FIGS. 1-2, the cart 100 also includes an adjustable bed assembly 114 generally between the tines 104, 106 to provide a versatile cart capable of carrying various items, including loose items. The illustrated bed assembly 114 includes a number (e.g., three shown) of bed members 114a adjustable relative to the tines 104, 106 between a storage or collapsed mode (see FIG. 1) and a flat bed or expanded mode (see FIG. 2). The bed assembly 114 is supported by the tines 104, 106 and the cart body 108.

In the illustrated embodiment, the bed assembly 114 is partially disposed between the tines 104, 106 in the collapsed mode (shown in FIG. 1). In other embodiments (not shown), in the collapsed mode, the bed assembly 114 may be partially or completely disposed within or under or removed from the cart body 108.

The illustrated bed assembly 114 is folded and unfolded between the collapsed mode and the expanded mode, respectively. In the collapsed mode, at least a majority of the intermediate space S1 is not occupied by the bed 114. In the expanded mode, the bed assembly 114 occupies a majority of the intermediate space S1 between the tines 104, 106. Alternatively, the bed assembly 114 may telescope, nest (see FIG. 7), be stacked, etc., in the collapsed mode.

In the collapsed mode of the bed assembly 114 (see FIGS. 1 and 5), the cart 100 may be used to transport a pallet on the tines 104, 106. When the bed assembly 114 is in the expanded mode (see FIG. 2), the cart 100 may be used to transport materials, products, etc. that may be placed directly on the bed assembly 114.

Figure 3:
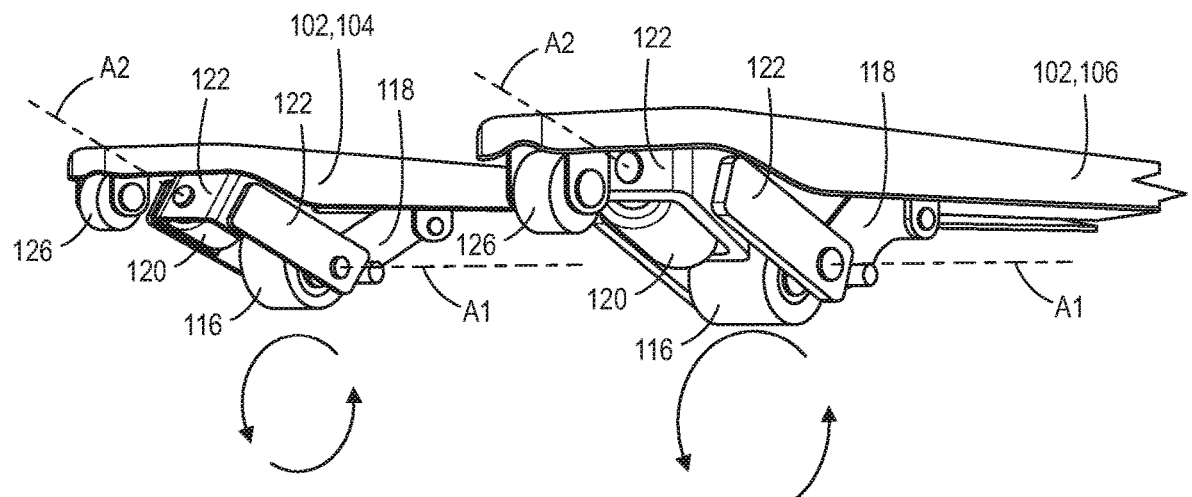
FIG. 3 is an enlarged perspective view of a portion of the material transport cart of FIG. 1, illustrating a set of first wheels engaging the ground.
Figure 4:
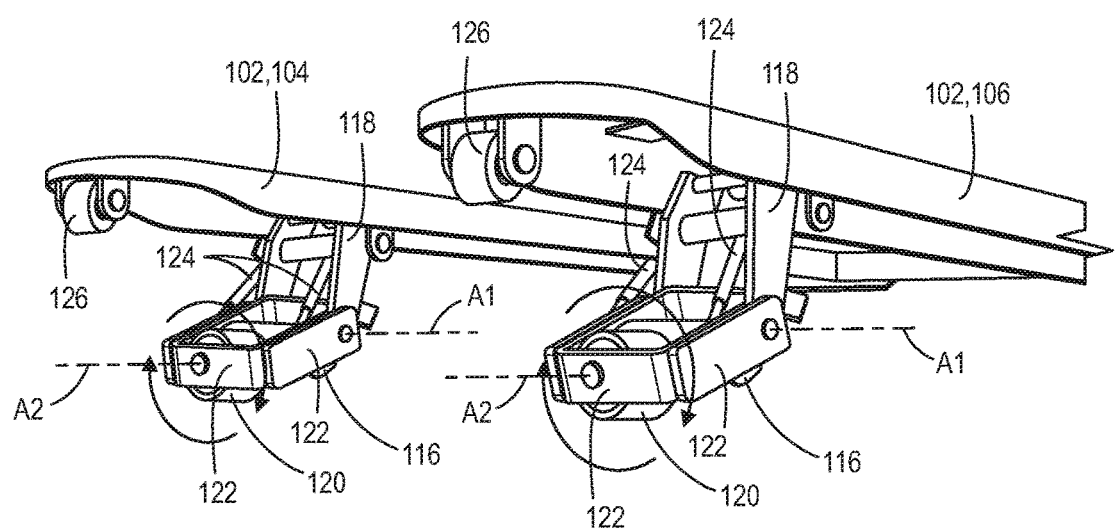
FIG. 4 is an enlarged perspective view of the portion of the material transport cart of FIG. 1, illustrating a set of second wheels engaging the ground.

As shown in FIGS. 3-4, the illustrated cart 100 includes at least one first wheel 116 (two shown) connected to the support body 102. Each first wheel 116 rotates about a first axis A1, and a first wheel frame 118 connects an associated first wheel 116 to the support body 102. In the illustrated embodiment, the first wheel frame 118 is pivotably connected to the support body 102.

The illustrated cart 100 further includes at least one second wheel 120 (two shown) connected to the support body 102. As shown, each second wheel 120 is a different wheel type, size, etc. compared to the first wheel 116; in other embodiments (not shown), the wheels 116, 120 may be substantially the same. Each second wheel 120 rotates about a second axis A2, and, in the illustrated embodiment, the first axis A1 and the second axis A2 extend in different directions (e.g., substantially perpendicular to each other).

A second wheel frame 122 connects an associated second wheel 120 to the first wheel frame 118. As shown, the second wheel frame 122 is pivotably connected to the first wheel frame 118. The second wheel frame 122 has multiple components pivotable relative to each other. In other embodiments (not shown), the second wheel frame 122 connects the second wheel 120 to the support body 102 directly without connecting to the first wheel frame 118.

The first wheel(s) 116 and the second wheel(s) 120 are utilized mutually exclusively during movement of the cart 100. Stated another way, only one of the first wheel(s) 116 (in a first wheel mode; see FIG. 3 (illustrating a "forward casters" or "default" mode)) or the second wheel(s) 120 (in a second wheel mode; see FIG. 4 (illustrating a "horizontal casters" mode and a maximum height)) contacts the ground at a given time.

The first wheel frame 118 pivots relative to the support body 102 either manually or automatically. In one embodiment, one or more detent mechanisms may be engaged to move the first wheel frame 118 to a given position relative to the support body 102. One or more actuators (e.g., hydraulic members 124) control the pivoted position of the first wheel frame 118 relative to the support body 102.

The second wheel frame 122 pivots relative to the first wheel frame 118 in a similar manner. The hydraulic members 124 control the pivoted position of the second wheel frame 122 relative to the support body 102 along with the first wheel frame 118. In other embodiments (not shown), the wheel frames 118, 122 may pivot in different manners or be fixed.

Hydraulic actuation through the handle 112 (e.g., by pumping the handle 112 relative to the cart body 108) to extend toward the ground first the first wheel(s) 116 followed by the second wheel(s) 120. In other embodiments (not shown), hydraulic actuation may be controlled by one or more hydraulic pumps, located inside or on the cart body 108, responsive to user controls.

Figure 5:
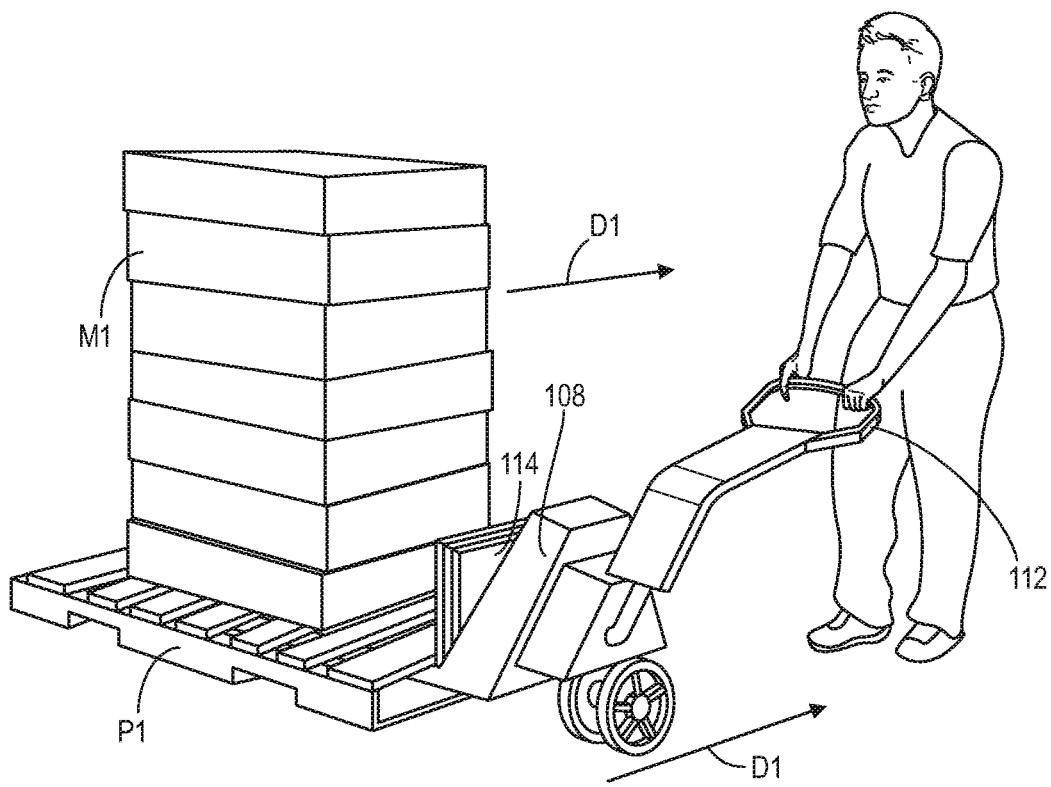
FIG. 5 is a perspective view of the material transport cart of FIG. 1, illustrating movement in a lateral direction with the set of second wheels engaging the ground.

In use, with the bed assembly 114 in the collapsed mode, a user moves the tines 104, 106 into a pallet P1 (as shown in FIG. 5). The first wheel(s) 116 and the second wheel(s) 120 are located close to the support body 102 for this movement. In such a configuration, the cart 100 moves with the first wheel(s) 116 contacting the ground. Additionally or alternatively, at least one third wheel 126 contacts the ground. This third wheel(s) 126 may be, for example, a fixed or rotatable caster wheel connected to the support body 102.

To lift the pallet P1, the user actuates the hydraulic member(s) 124 to pivot the first wheel frame 118 and move the first wheel(s) 116 away from the support body 102. As the first wheels 116 move away from the support body 102, the support body 102 is lifted. The first wheels 116 remain in contact with the ground (the first wheel mode), and the user moves the cart 100 utilizing the first wheels 116. As the first wheel 116 moves away from the support body 102, the associated second wheel 120 also moves away from the support body 102 but does not yet contact the ground.

If a user continues to actuate the hydraulic member(s) 124, the second wheel(s) 120 will contact the ground and the first wheel(s) 116 will move out of contact with the ground (the second wheel mode; as shown in FIG. 4). While there may be a position in which both wheels 116, 120 contact the ground, the cart 100 is not intended to move in this position. When both wheels 116, 120 contact the ground, the cart 100 is not in the first wheel mode or the second wheel mode.

Figure 6:
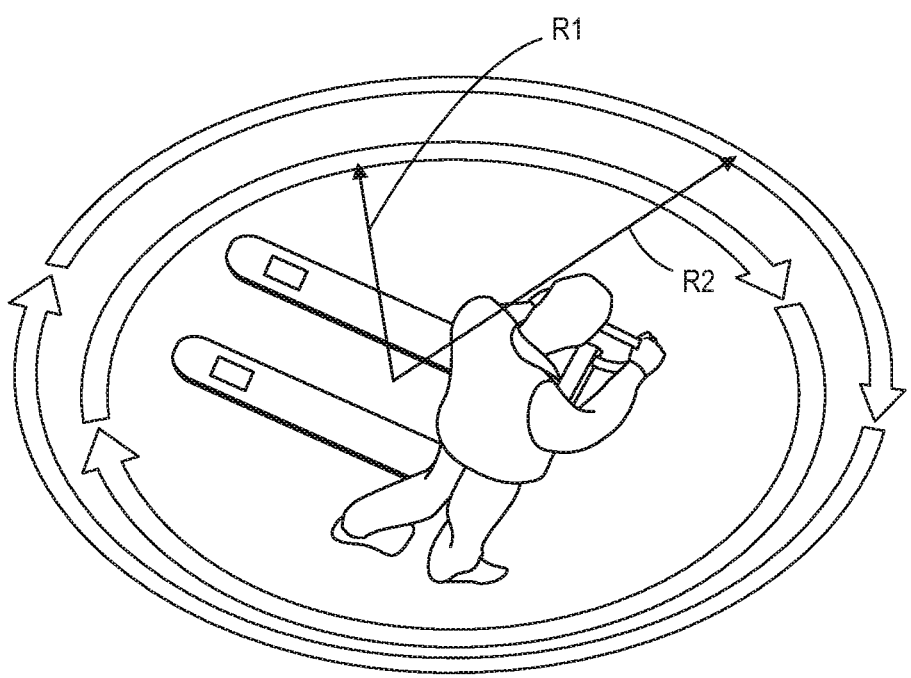
FIG. 6 is a top plan view of the material transport cart of FIG. 1, illustrated a smaller turning radius with the set of second wheels engaging the ground.

To transport materials M1, with or without a pallet P1, in a manner similar to a traditional pallet cart, the user operates the cart 100 in the first wheel mode with the first wheel(s) 116 contacting the ground. If the user wishes to turn the cart 100 with a tighter turning radius R1 (a "6th wheel" turning radius) than a turning radius R2 of a traditional pallet cart (as shown in FIG. 6), the user operates the cart 100 in the second wheel mode with the second wheel(s) 120 contacting the ground. Similarly, if the user wishes to move the cart 100 in a direction D1 impossible for a traditional pallet cart (for instance, "horizontal mobility" in a direction perpendicular to the length of the tines 104, 106 or parallel to the axis A1 (see FIG. 5)), the user operates the cart 100 in the second wheel mode with the second wheel(s) 120 contacting the ground.

FIGS. 7-14 illustrate another embodiment of a cart, such as a material transport cart 200. The cart 200 is similar to the cart 100 described above and shown in FIGS. 1-6. Features that are similar or identical to those discussed above may not be described in detail herein. Common elements have the same reference number plus "100".

As mentioned above, the illustrated bed assembly 214 slides relative to the cart body 208 between the expanded mode and the collapsed mode and nests within itself in the collapsed mode. The bed assembly 214 may include a non-slip material.

Figure 9:
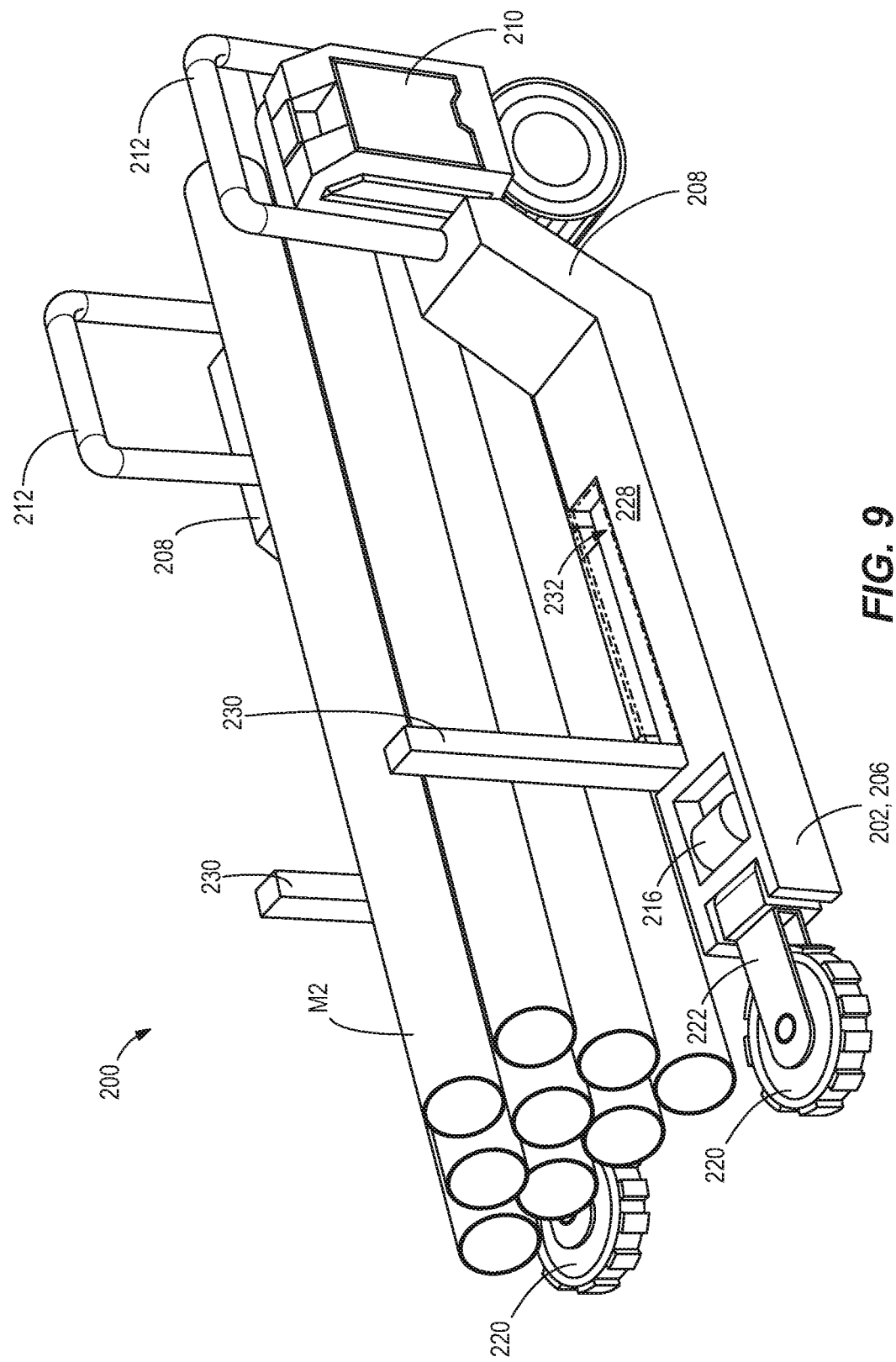
FIG. 9 is a perspective view of the material transport cart of FIG. 7, illustrating material containment barrier members in a containment position.
Figure 10:
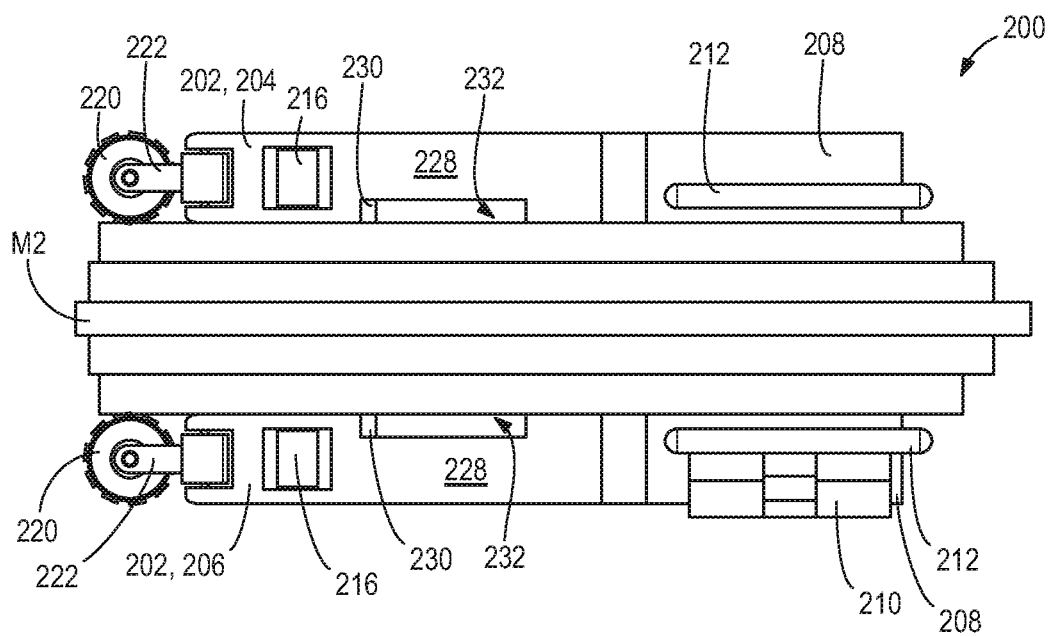
FIG. 10 is a top plan view of the material transport cart of FIG. 7, illustrating the material containment barrier members in the containment position.

The material transport cart 200 includes a generally U-shaped cart body 208. The power source 210 is connected to an outside of the cart body 208. The cart 200 includes two handles 212 fixedly connected to the cart body 208. This illustrated configuration of the cart body 208 and the separate handles 212 facilitates transportation of elongate materials M2 (as shown in FIGS. 9-10).

Figure 12:
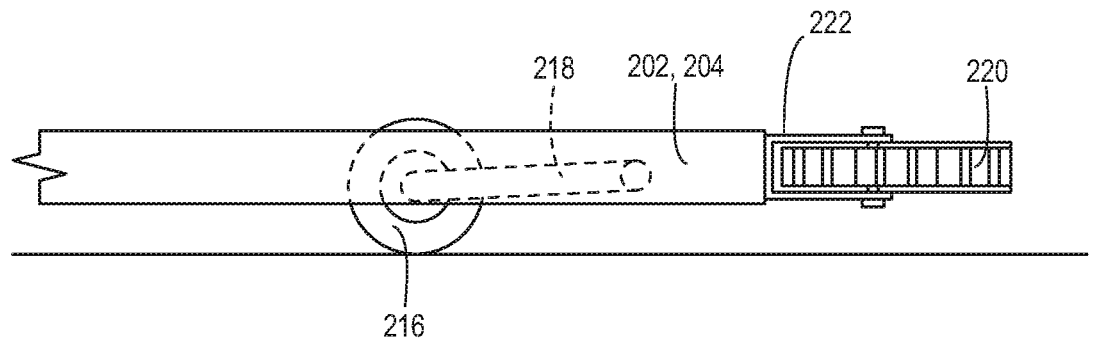
FIG. 12 is a side perspective view of the portion of the material transport cart of FIG. 7, illustrating a first wheel engaging the ground and in a rest position.
Figure 13:
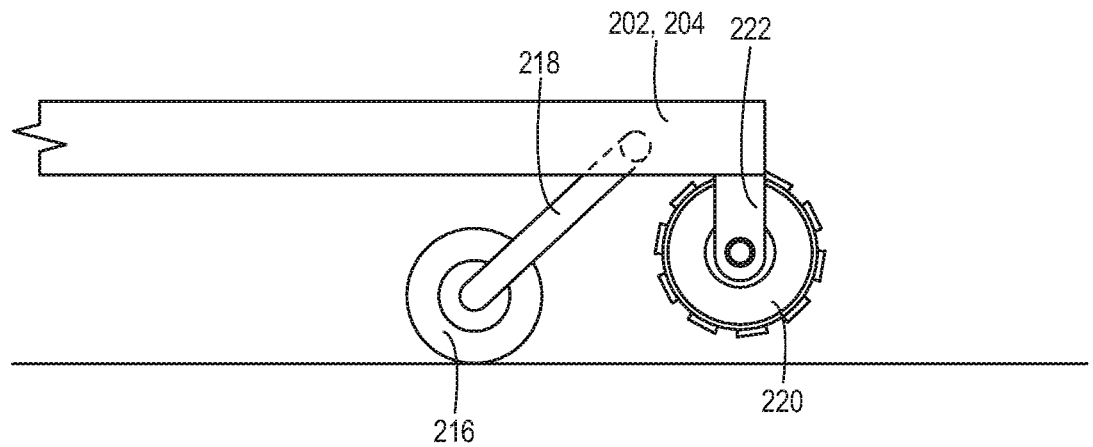
FIG. 13 is a side perspective view of the portion of the material transport cart of FIG. 7, illustrating the first wheel engaging the ground and in a lift position.

The first wheel(s) 216 operate similarly to the first wheel(s) 116 described above. As shown in FIGS. 12-13, a user actuates a hydraulic system or similar mechanism to move the first wheel(s) 216 away from the support body 202 if the support body 202 needs to be lifted to, for example, lift a pallet P1. A user may move the cart 200 with the first wheel(s) 216 contacting the ground (the first wheel mode) whether the support body 202 is lifted or not.

Figure 11:
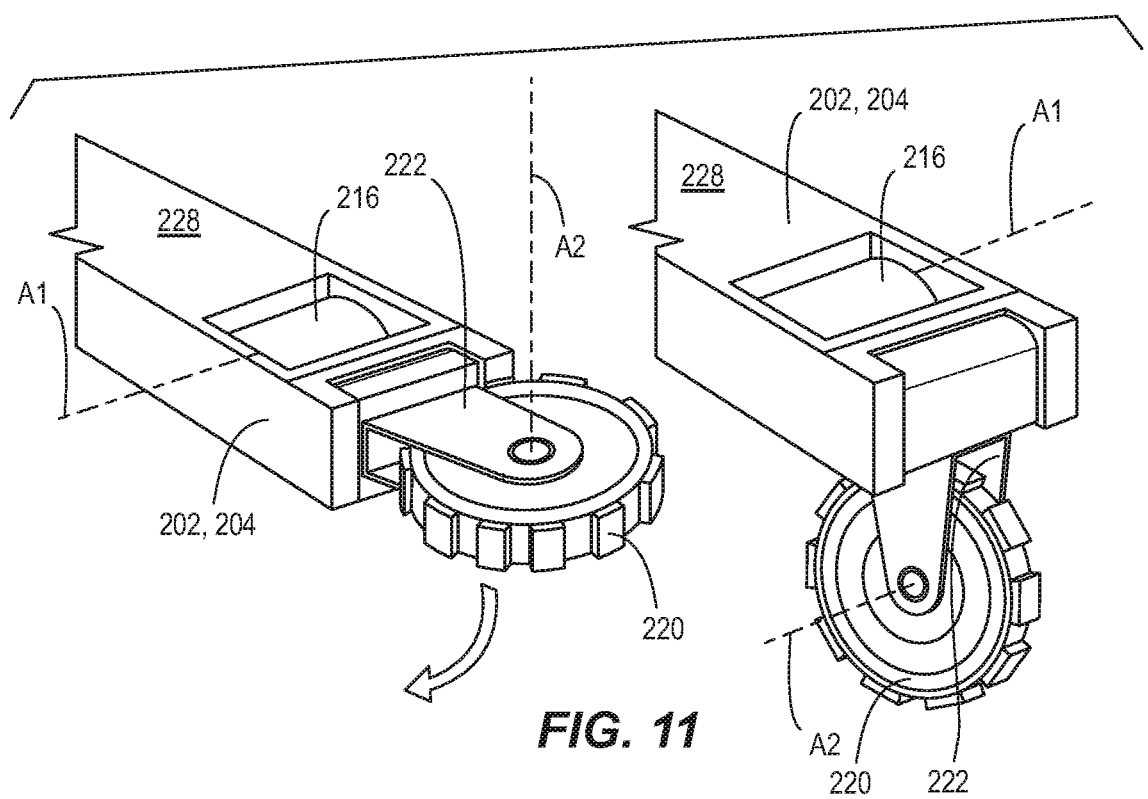
FIG. 11 is an enlarged perspective view of a portion of the material transport cart of FIG. 7, illustrating a second wheel moving from an unengaged position to an engaged position.
Figure 14:
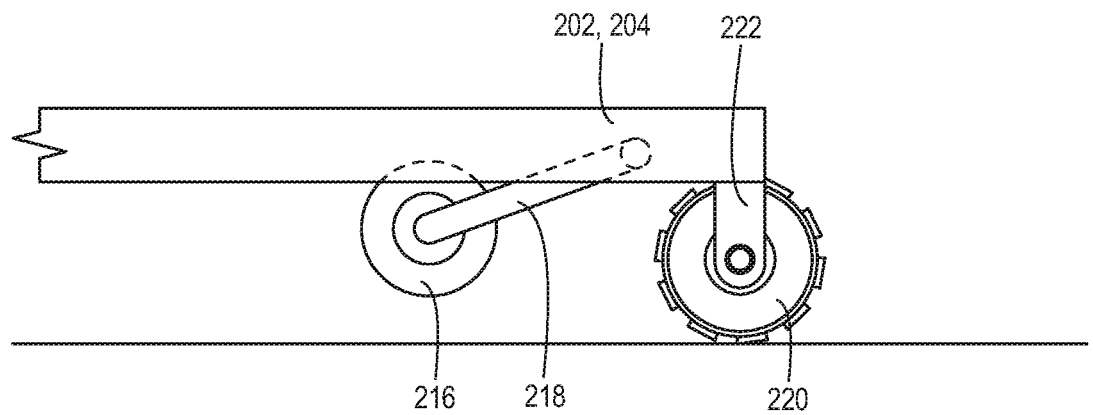
FIG. 14 is a side perspective view of the portion of the material transport cart of FIG. 7, illustrating the second wheel engaging the ground.

Turning now to FIGS. 11 and 13-14, to switch to the second wheel mode, the user actuates the hydraulic system to move the first wheel(s) 216 away from the support body 202. Once the support body is raised a sufficient height, the user pivots the second wheel frame 222 relative to the support body 202 until each second wheel 220 is in the appropriate position (see FIG. 13; a "jack up/wheel down" position). Once each second wheel 220 is in the appropriate position, the user actuates the hydraulic system or other mechanism to move the first wheel(s) 216 toward the support body 202. The support body 202 will then lower until the second wheel 220 contacts the ground (see FIG. 14). The user may then move the cart 200 with the second wheel(s) 220 contacting the ground (the second wheel mode). The illustrated second wheels 220 are larger and may provide improved mobility over rough terrain, debris, etc.

The second wheel frame 222 may be pivotable relative to the support body 202 not only to switch the cart 200 to the second wheel mode, but also to place the second wheel 220 in an orientation for rolling along the ground in the second wheel mode. With this functionality, the second wheel(s) 220, when in contact with the ground, may rotate about the second axis A2 parallel, perpendicular, or at some other angle relative to the first axis A1 of the first wheel(s) 216.

The second wheel frame 222 is locked in a given position relative to the support body 102 with, for example, a detent mechanism. In some embodiments, the second wheel frame 222 may lock in the second wheel mode, but the second wheel frame 222 may still be freely pivotable about a third axis A3 such that each second wheel 220 acts like a swivel caster. With a second wheel frame 222 that is pivotable about the third axis A3, each second wheel 220 may be positioned such that its profile is substantially similar to the associated tine 204, 206 and locked in place when the cart 200 is in the first wheel mode (see FIG. 7). This positioning could allow the tines 204, 206 to be inserted in the openings of a pallet P1 without obstruction by the second wheel(s) 220.

Figure 7:
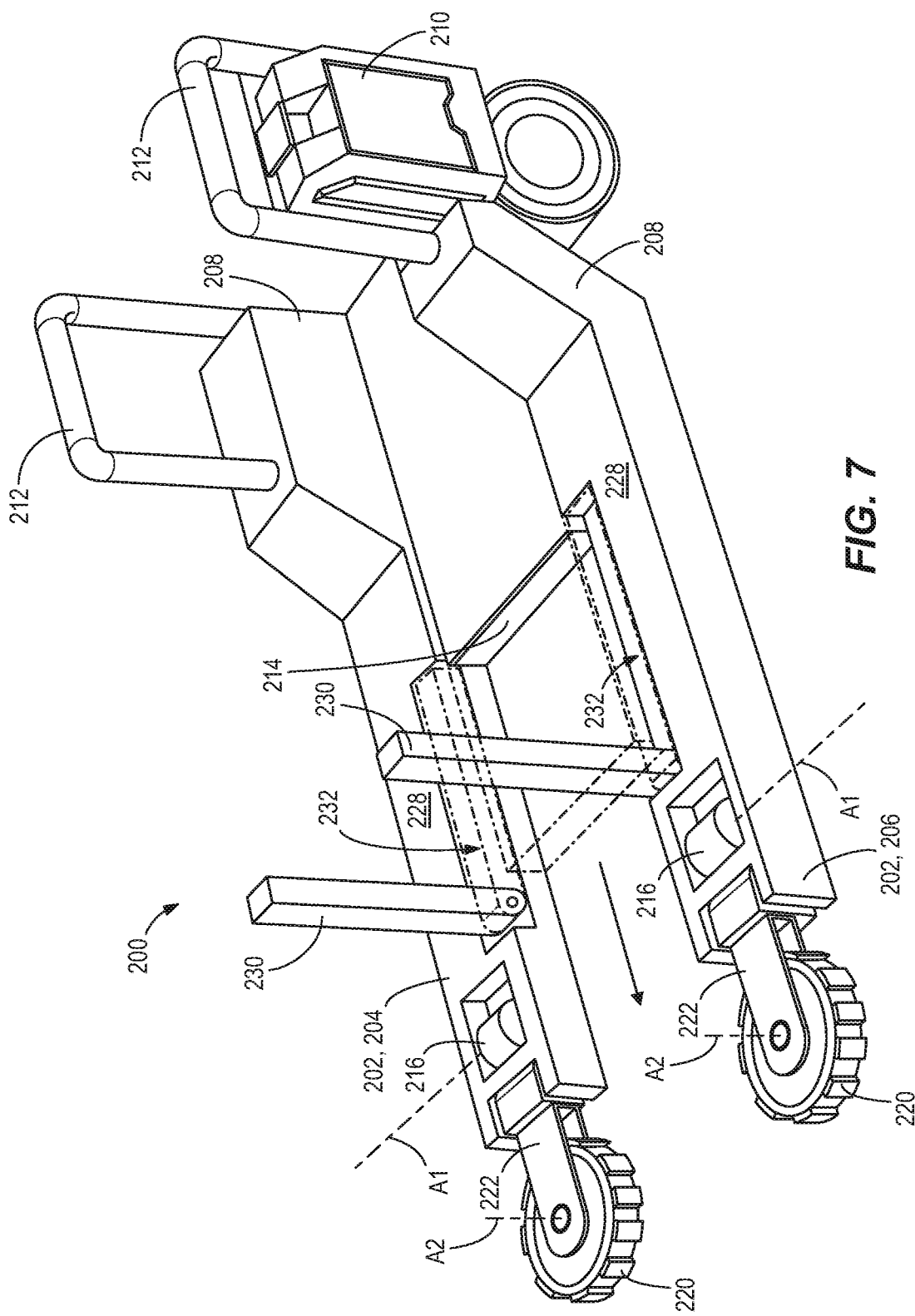
FIG. 7 is a perspective view of another material transport cart, illustrating a set of first wheels engaging the ground.
Figure 8:
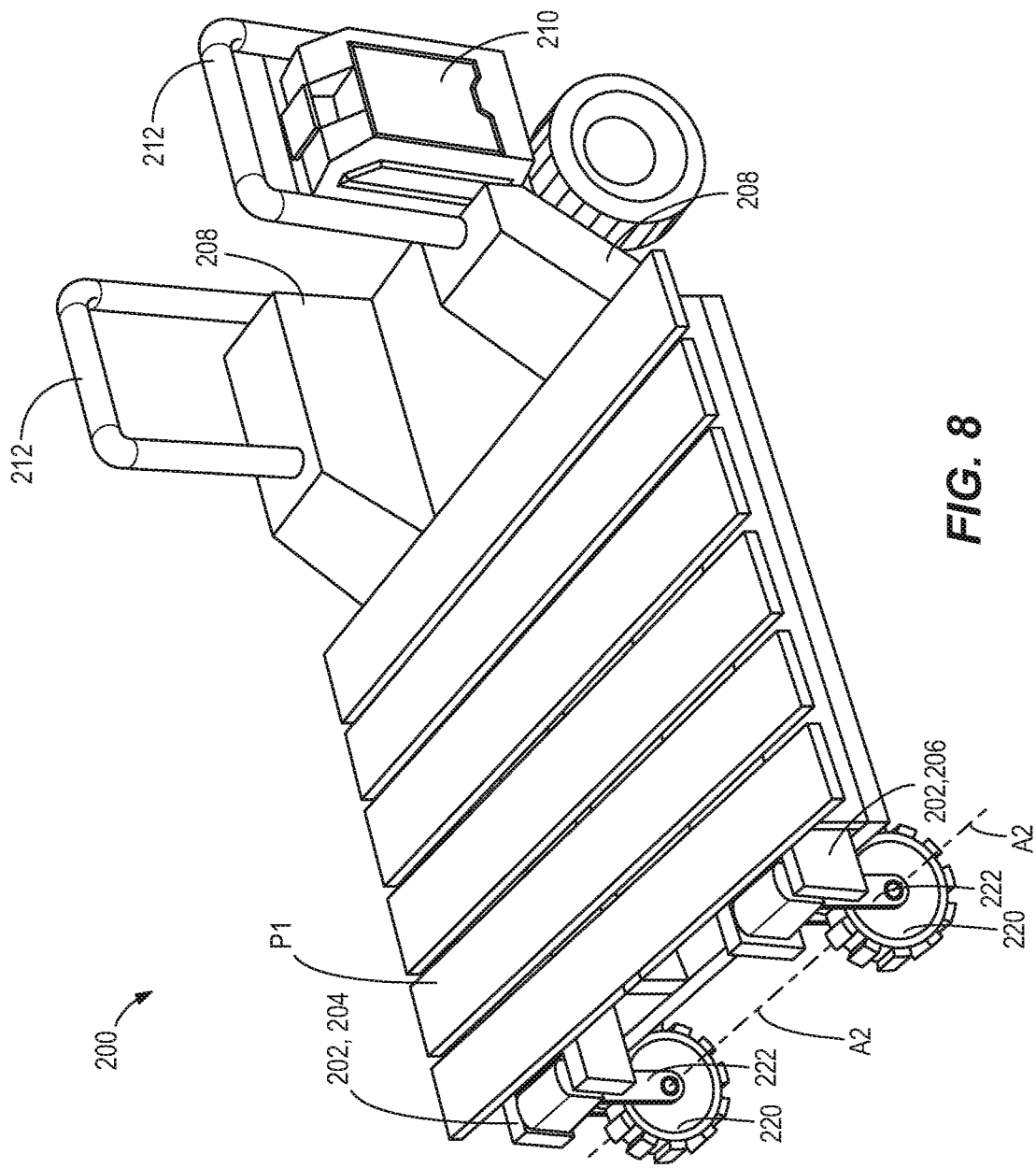
FIG. 8 is a perspective view of the material transport cart of FIG. 7, illustrating a set of second wheels engaging the ground.

Turning now to FIGS. 7 and 9-10, the cart 200 includes a material support surface 228 of the support body 202. At least one material containment barrier 230 is connected to the material support body 202. As shown, the material containment barrier 230 is pivotably connected to the material support body 202 for movement between a storage position (see FIG. 8), in which the material containment barrier 230 does not extend beyond the material support surface 228, and a containment position (see FIGS. 7 and 9-10), in which the material containment barrier 230 extends beyond the material support surface 228 (e.g., in an upward direction away from the ground).

In the storage position, the material containment barrier 230 may be disposed below or substantially flush with the material support surface 228. As shown particularly in FIGS. 7 and 9-10, the material support body 202 defines an indentation, alcove, cut-out, chamfer, or recess 232. In the storage position, the material containment barrier 230 is disposed in the recess. In embodiments having multiple material containment barrier members 230, each material containment barrier member 230 is disposed in a respective recess 232 in the storage position. With the material containment barrier members 230 stored, the cart 200 may be used in a pallet configuration.

FIGS. 15-18 illustrate yet another embodiment of a cart, such as a material transport cart 300. The cart 300 is similar to the cart 100, 200 described above and shown in FIGS. 1-14. Features that are similar or identical to those discussed above may not be described in detail herein. Common elements have the same reference number plus "100".

The cart 300 includes a cart body 308 connected to a lift assembly 334. (e.g., a single or multi-scissor lift powered by a hydraulic cylinder, pump and motor). The material support body 302 is translatably connected to at least one of the cart body 308 and the lift assembly 334 for movement between a transport mode (see FIG. 15) and lift modes (see FIGS. 16-18). A single user is able to operate the illustrated cart 300 to lift the cart 300 into and out of vehicles, onto and off of platforms, etc., while loaded.

The lift assembly 334 further includes (see FIGS. 16-18) a base member 336 configured to engage the ground in the lift mode. When the material transport cart 300 is in a transport mode (see FIG. 15), the wheels 326 contact the ground, and the base member 336 does not contact the ground. As discussed above, the wheels 326 may be any appropriate wheels such as fixed or rotatable caster wheels (e.g., rough terrain wheels 326 illustrated).

Figure 15:
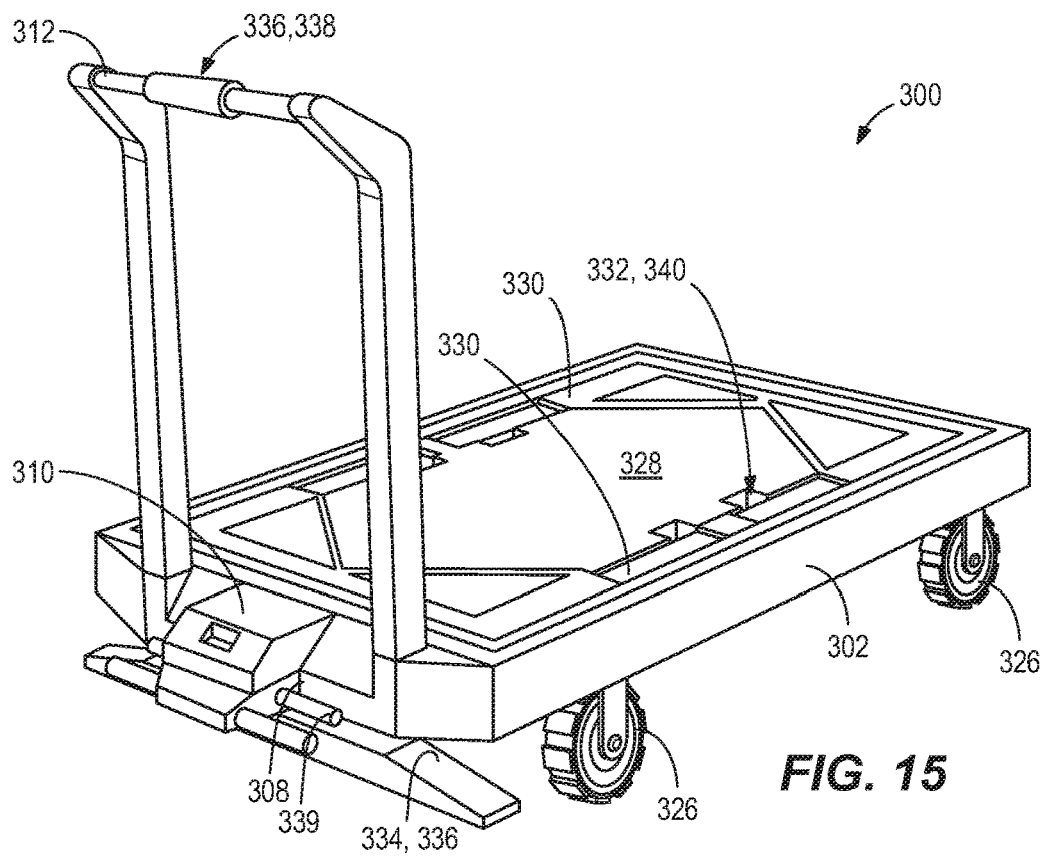
FIG. 15 is a perspective view of yet another material transport cart.
Figure 16:
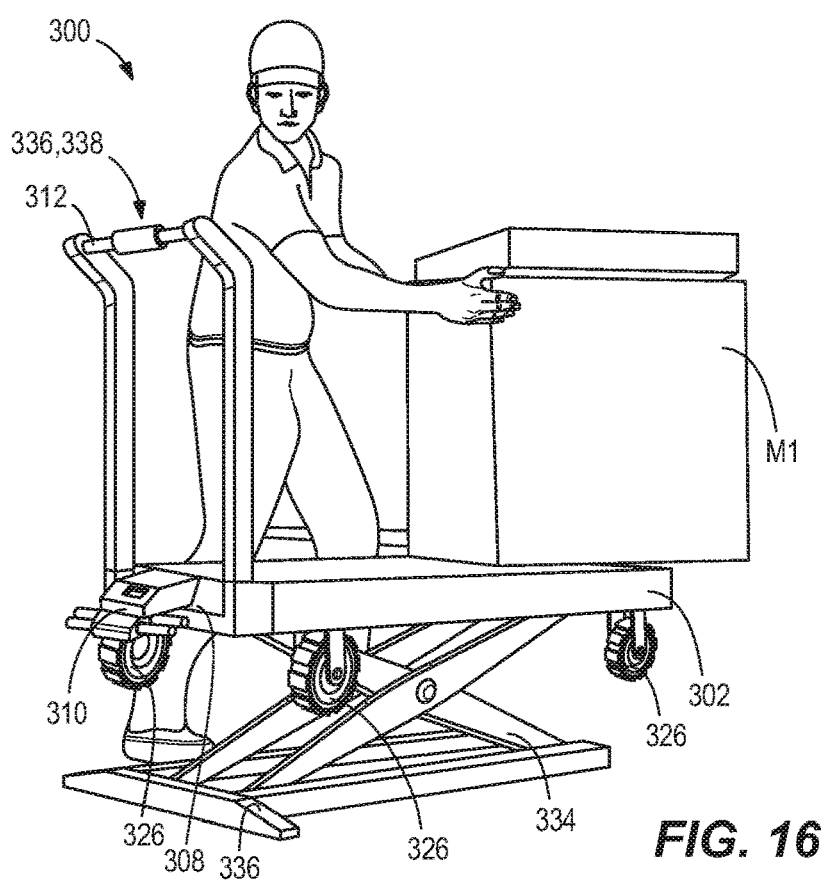
FIG. 16 is a perspective view of the material transport cart of FIG. 15, illustrating an intermediate lift position.
Figure 17:
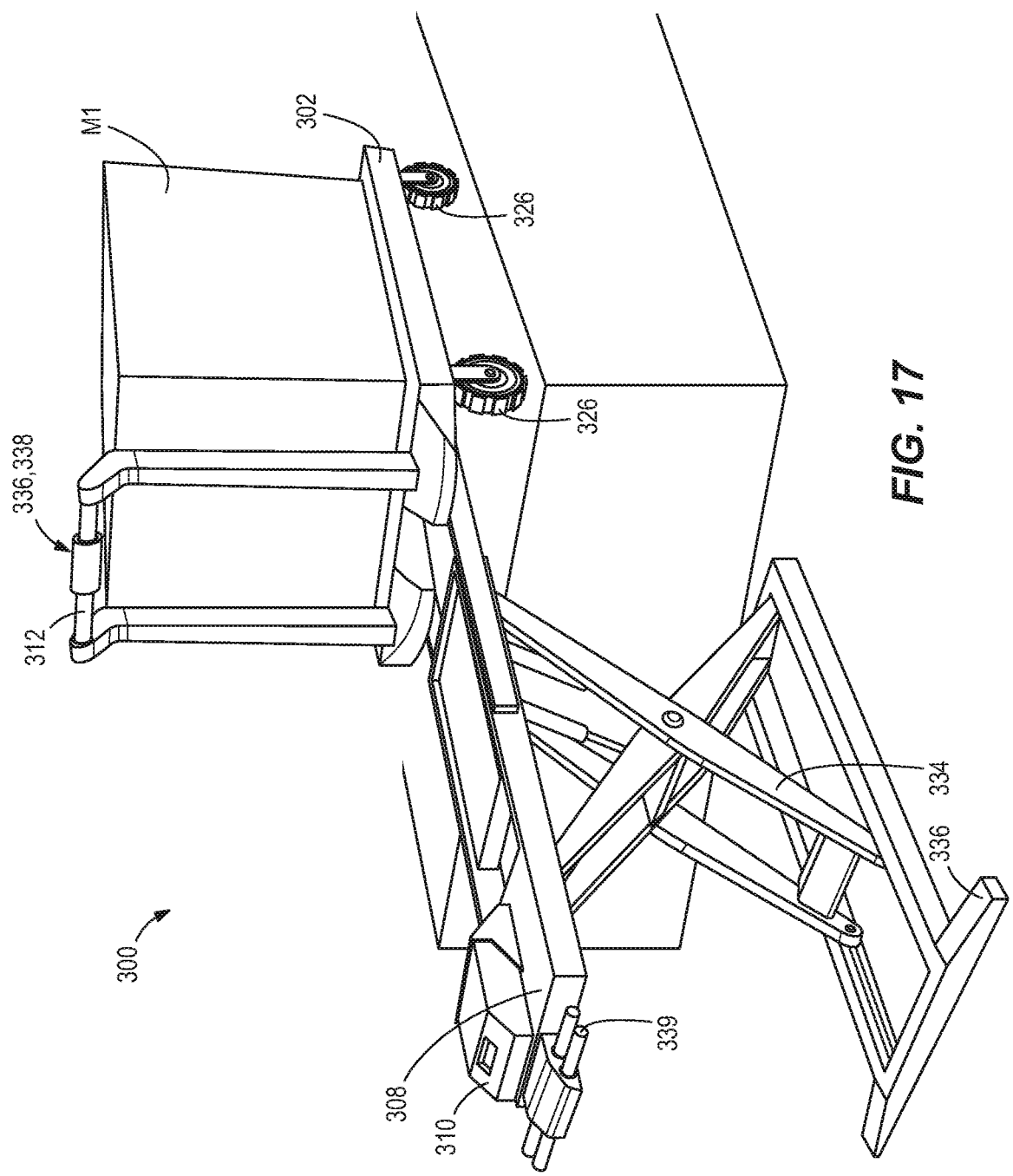
FIG. 17 is a perspective view of the material transport cart of FIG. 15, illustrating a higher lift position and extension of the chassis.

Lift assembly user controls 336 and cart movement user controls 338 are disposed on the handle 312. Horizontal slide user controls 339 are disposed on the cart body 308. FIGS. 15-17 illustrate adjustment of the cart 300 between the transport mode (FIG. 15), the lift mode (FIG. 16; e.g., to waist height (for working) or higher), and a lift and slide mode (FIG. 17; in which stair/ledge climbing may also be provided). The controls 336, 338, 339 may be provided on a tethered pendant.

Figure 18:
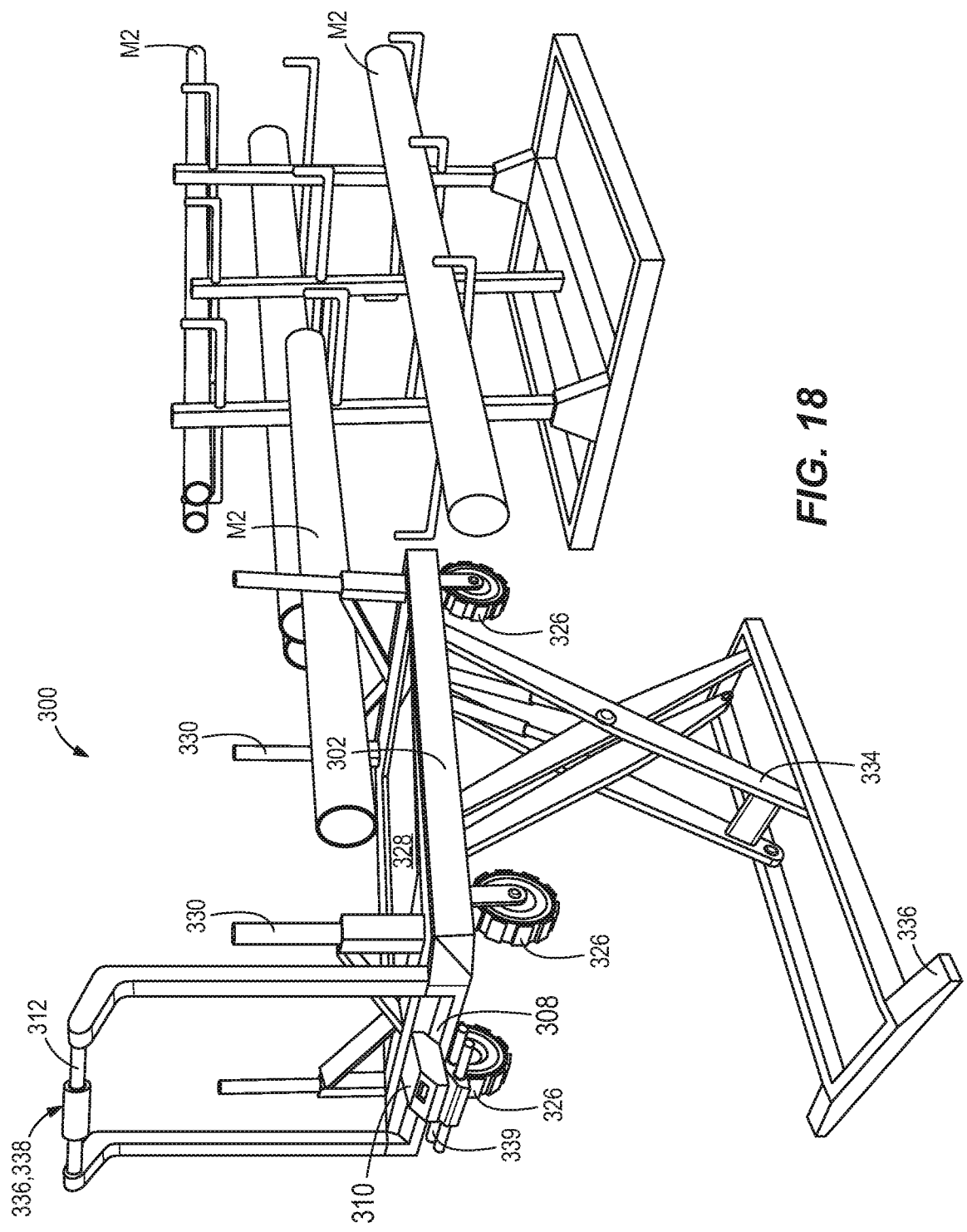
FIG. 18 is a perspective view of the material transport cart of FIG. 15, illustrating a still higher lift position and with material containment barrier members in a containment position.

The cart 300 includes an alternative embodiment of a material containment barrier 330 adjustable between a storage position (see FIGS. 15-17) and a containment position (see FIG. 18). Rather than the single arm of the material containment barrier 230, each material containment barrier 330 includes two arms connected by a V-shaped base. The recess 332 corresponding to each material containment barrier 330, (see FIG. 15) is surrounded on all sides by the material support surface 328 (as opposed to being along the edge of the material support surface 228 like the material containment barrier 230). A user engagement portion 340 of the recess 332 facilitates access to the material containment barrier 330 with a finger, hand, tool, etc., when the material containment barrier 330 is in the storage position.

FIGS. 19-23 illustrate a further embodiment of a cart, such as a material transport cart 400. The cart 300 is similar to the cart 100, 200, 300 described above and shown in FIGS. 1-18. Features that are similar or identical to those discussed above may not be described in detail herein. Common elements have the same reference number plus "100" from the highest number for the element.

Figure 20:
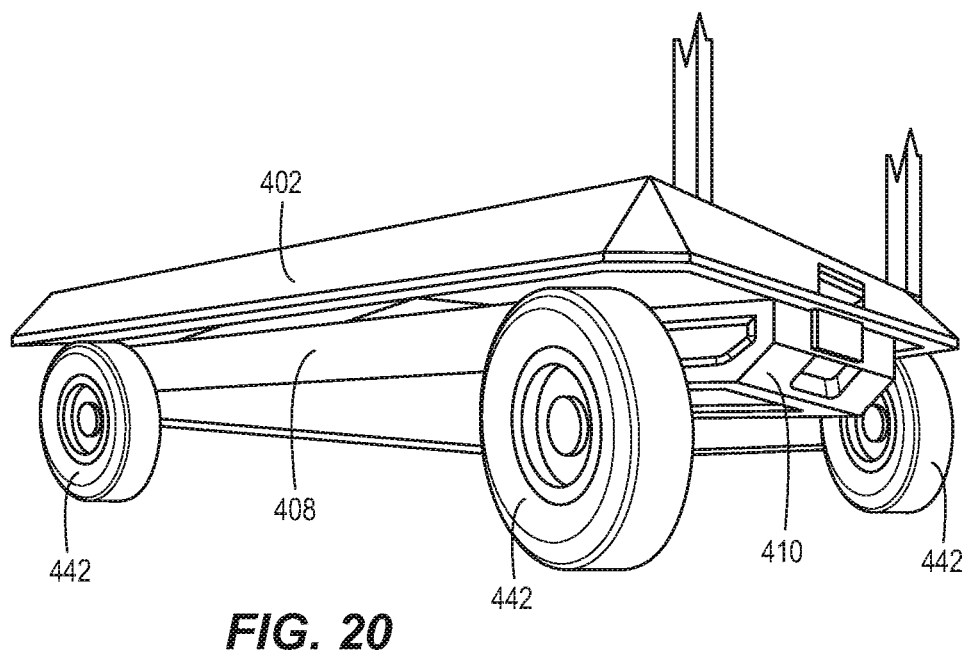
FIG. 20 is an enlarged perspective view of an underside of the material transport cart of FIG. 19.
Figure 21:
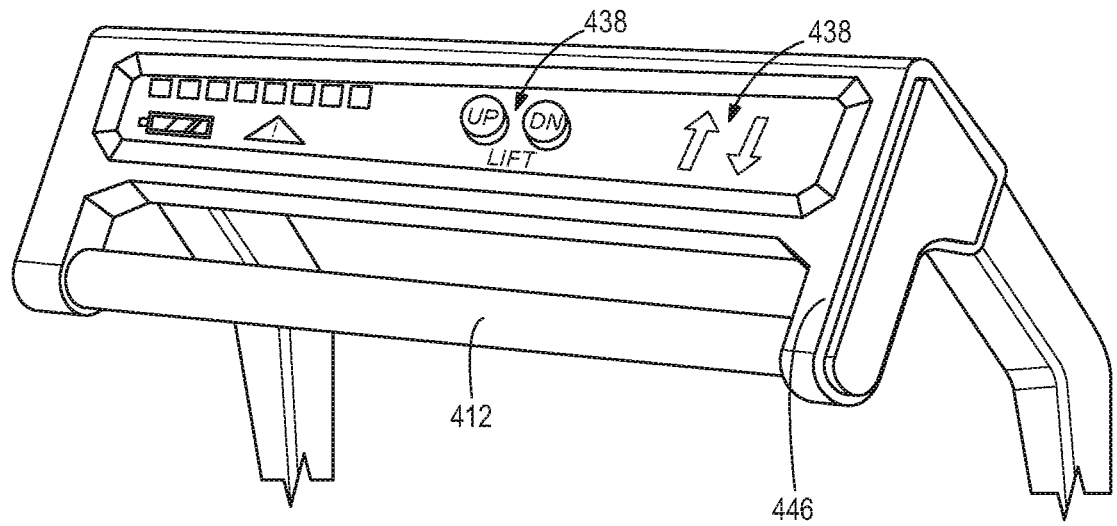
FIG. 21 is an enlarged perspective view of a user interface console of the material transport cart of FIG. 19.
Figure 22:
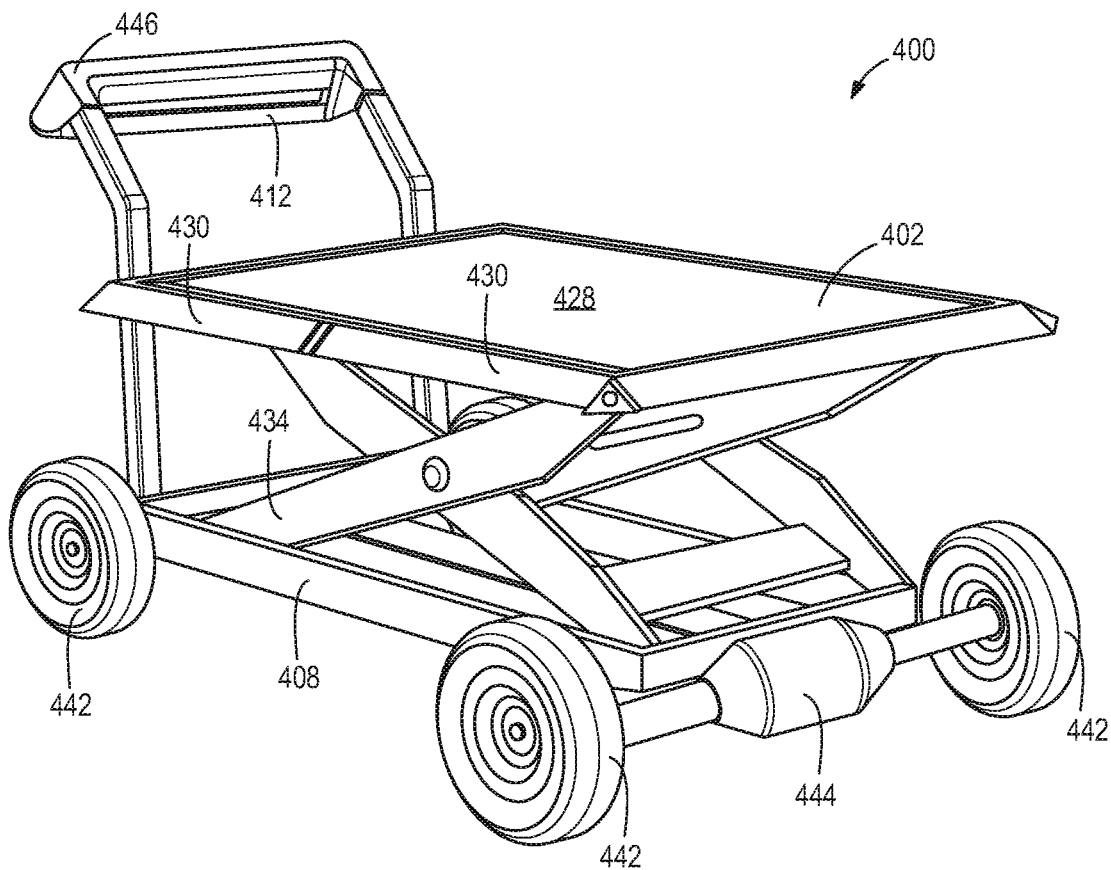
FIG. 22 is a perspective view of the material transport cart of FIG. 19, illustrating an intermediate lift position.

As shown in FIG. 20, the power source 410 is connected below the cart body (or cart chassis) 408. Wheels 442 (e.g., rugged polymer wheels 442 designed for uneven surfaces) are connected to the cart chassis 408. The power source 410 is operable to power one or more electric motors 444 (one shown) to selectively propel the cart 400 (e.g., forward, reverse, neutral, turn, etc.). As shown in FIG. 22, a lift assembly 434 is connected between the cart chassis 408 and a material support body 402 to lift the support body 402 (e.g., to waist or shoulder height).

Figure 19:
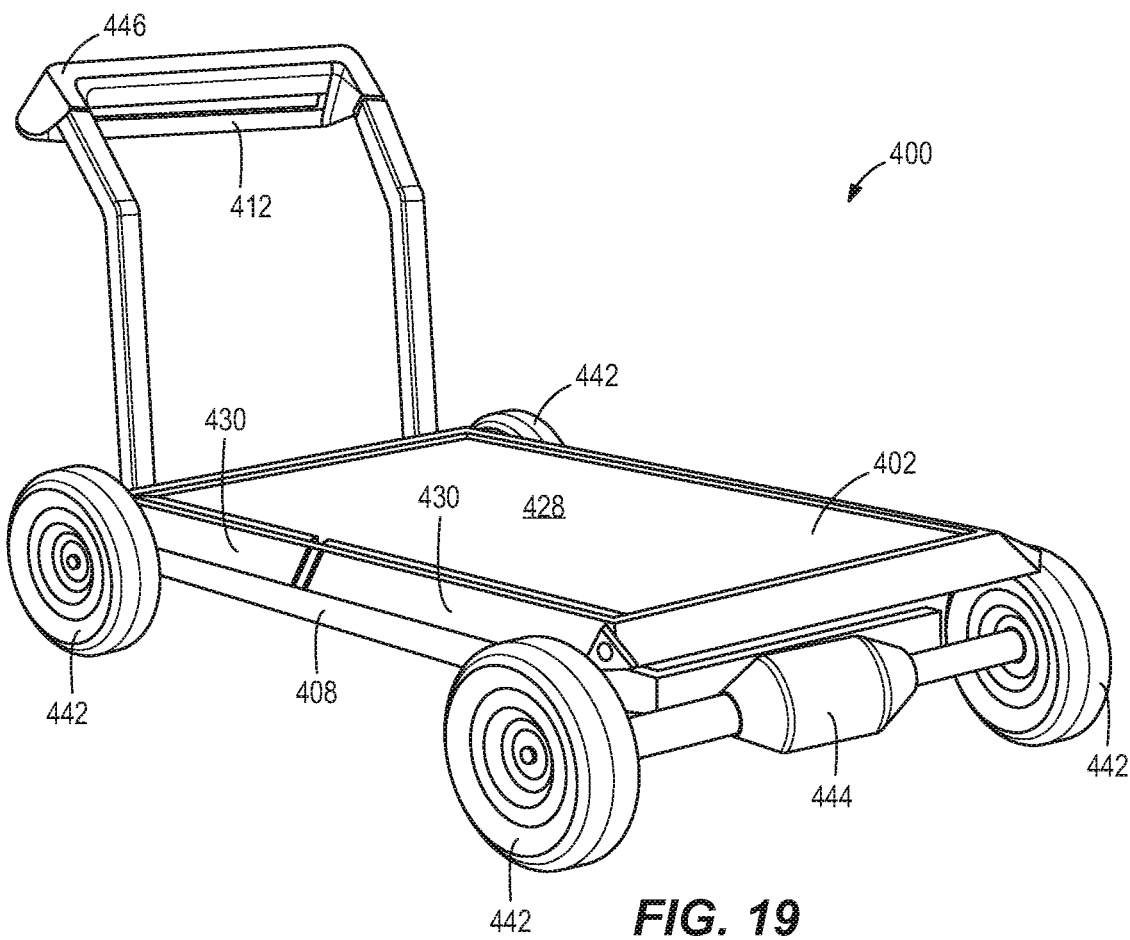
FIG. 19 is a perspective view of a further material transport cart.
Figure 23:
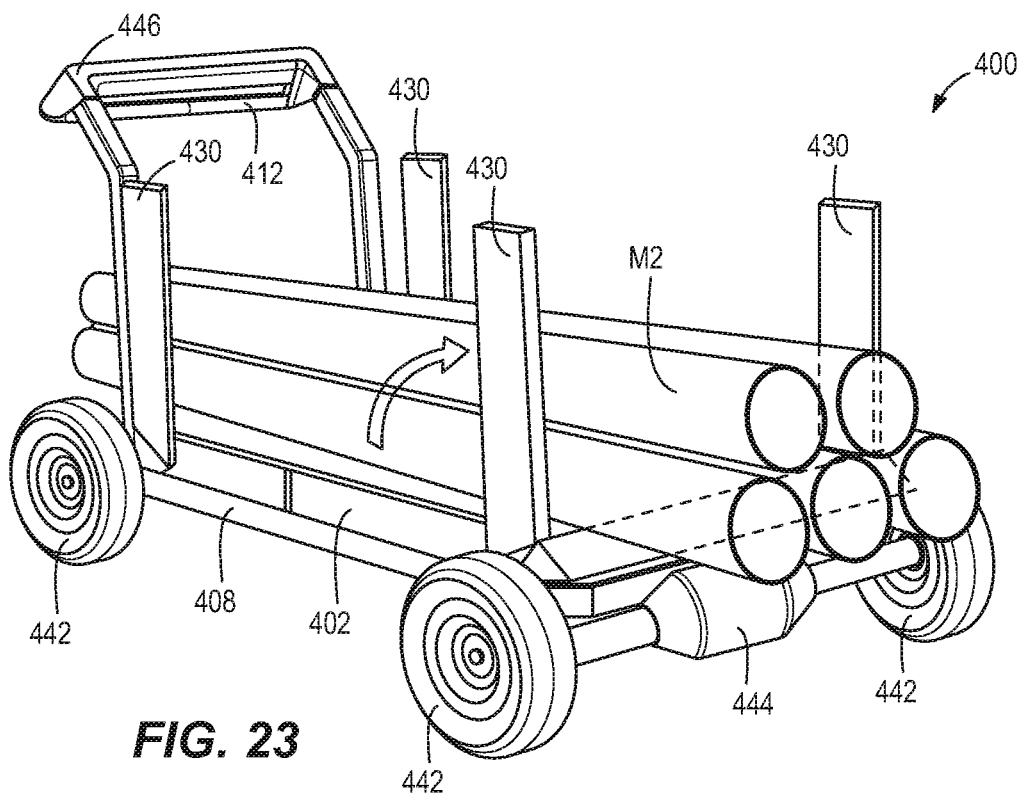
FIG. 23 is a perspective view of the material transport cart of FIG. 19, illustrating material containment barrier members in a containment position.

The support body 402 has a material support surface 428 with a slip-resistant surface (see FIGS. 19 and 22-23). One or more material containment barriers 430 (four shown) are connected to the support body 402 (e.g., along the lateral edges). A handle 412 is connected to the cart chassis 408 and includes, at its upper portion a user interface console 446 with lift assembly user controls 436 and cart movement user controls 438.

Figure 24:
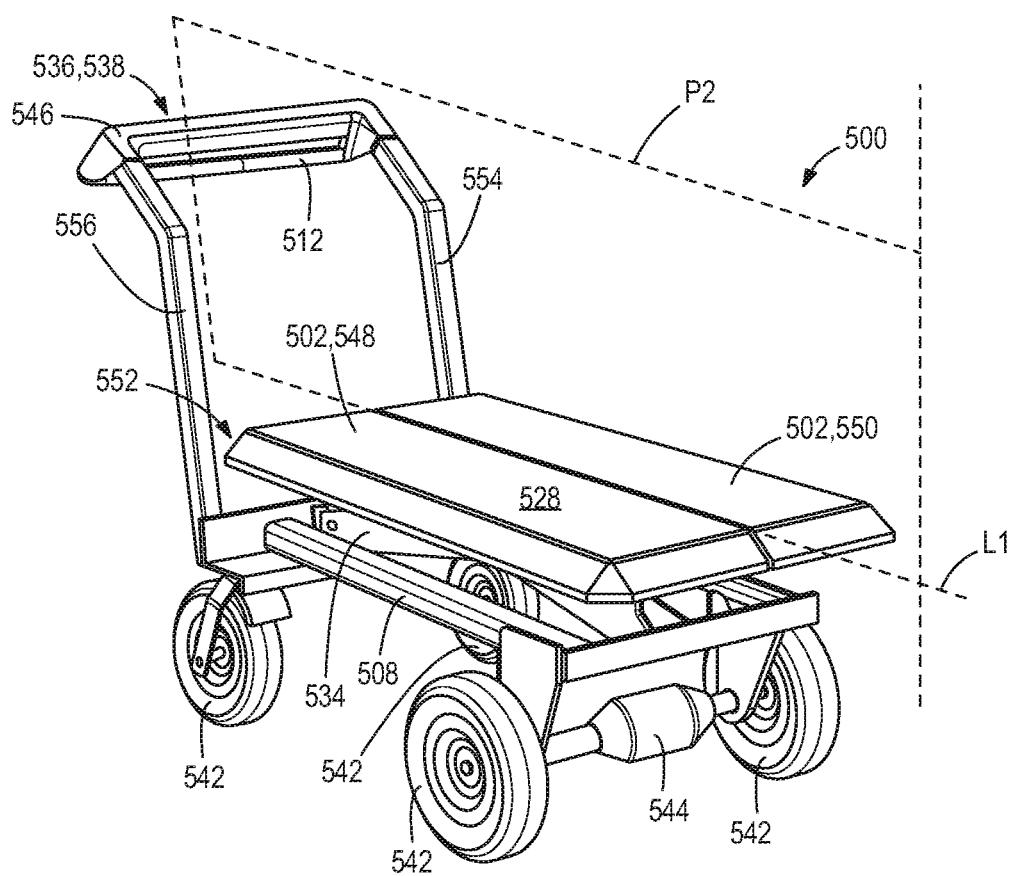
FIG. 24 is a perspective view of another material transport cart.
Figure 25:
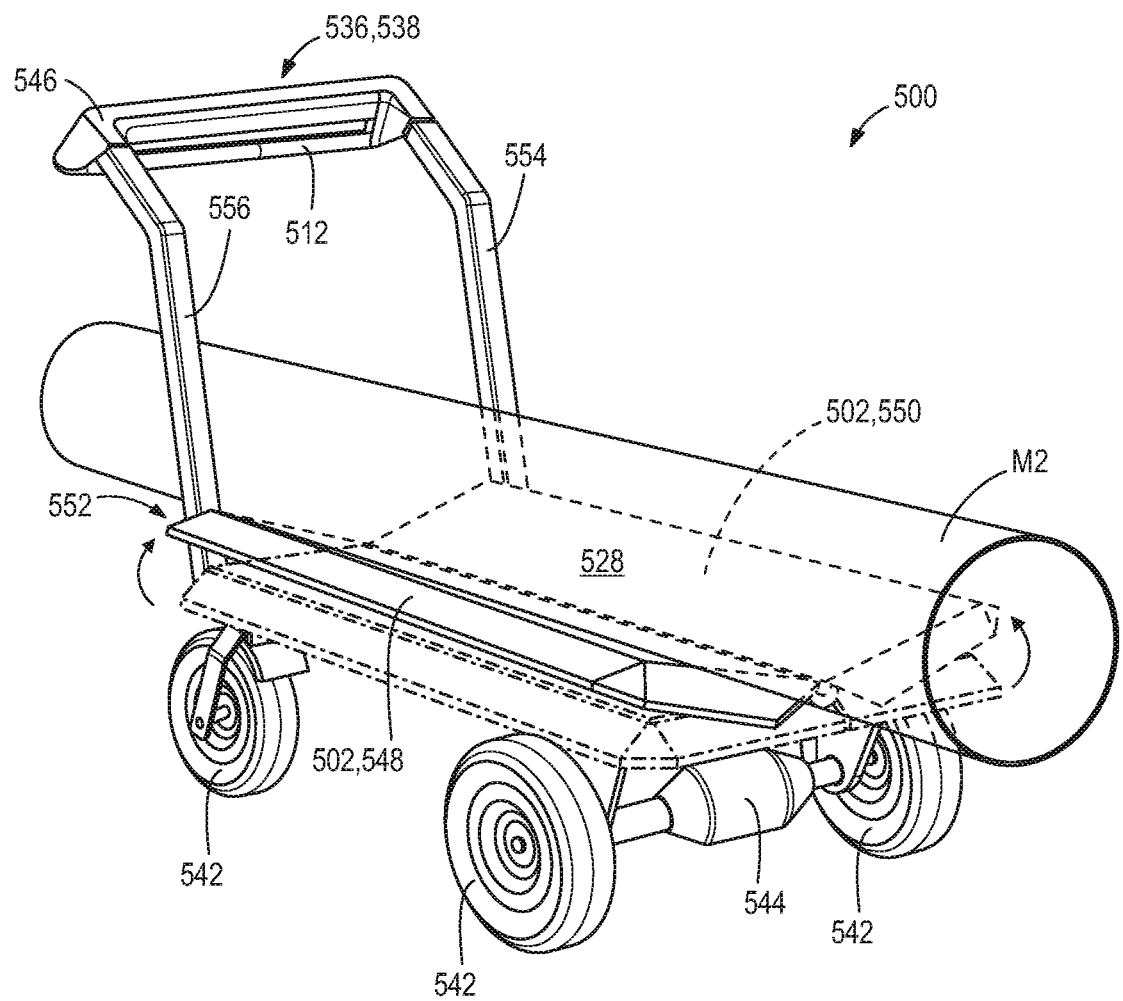
FIG. 25 is a perspective view of the material transport cart of FIG. 24 with a material support surface in a material containment mode.
Figure 26:
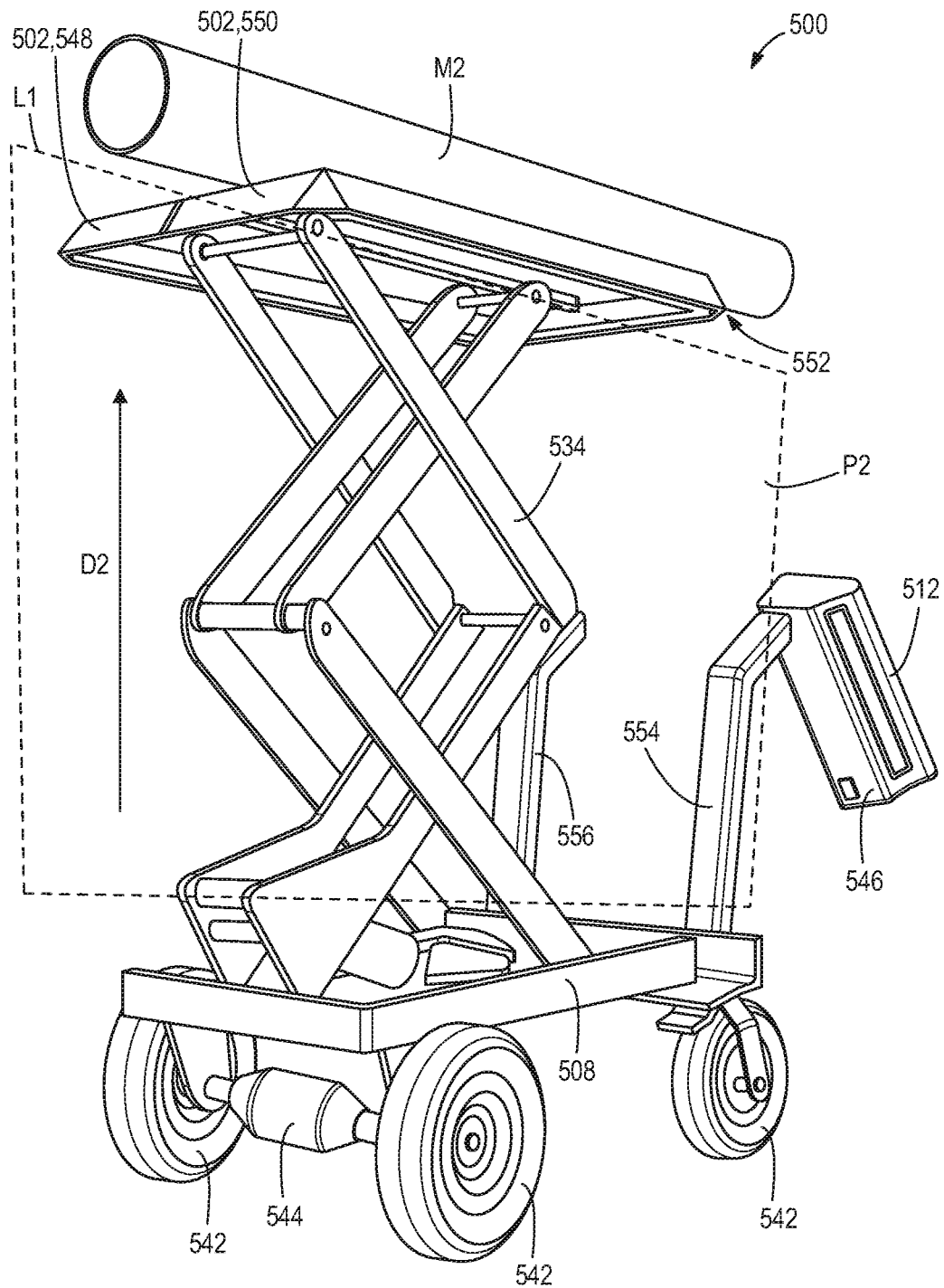
FIG. 26 is a perspective view of the material transport cart of FIG. 24 in a lift mode.

FIGS. 24-26 illustrate another embodiment of a cart, such as a material transport cart 400. The cart 300 is similar to the cart 100, 200, 300, 400 described above and shown in FIGS. 1-23. Features that are similar or identical to those discussed above may not be described in detail herein. Common elements have the same reference number plus "100" from the highest number for the element.

In the material transport cart 500, a lift assembly 534 (e.g., a multi-scissor lift) is connected between the cart chassis 508 and a material support body 502 to lift the support body 502 in a lifting direction D2 (see FIG. 26) between a lowered position (FIG. 24) and an elevated position (FIG. 26). As shown in FIG. 26, the support body 502 is liftable to a height above the handle 512.

In the illustrated embodiment, the support body 502 includes a first material support body section 548 pivotably (e.g., hingedly) connected to a second material support body section 550. This relationship allows the support body sections 548, 550 to move relative to each other to adjust the support surface 528 changes between a flatbed mode (shown in FIG. 24) and a material containment mode (shown in FIG. 25), in which the support surface 528 is concave (e.g., generally V-shaped).

In other embodiments, the support surface 528 may be constructed to have a more curvilinear material support surface 528 in the material containment mode. The support body 502 may include more than two support body sections to provide a different configuration in the containment mode. With sufficient support body sections, discrete material containment concavities or V-shapes could be arranged adjacent one another in the containment mode.

The material support body 502 defines (see FIG. 24) a longitudinal centerline L1 parallel to or collinear with the pivoting connection between the support body sections 548, 550. The material support body 502 also has a user end 552. A longitudinal plane P2 is coplanar with the centerline L1, parallel to the lifting direction D2, and extends beyond the user end 552.

As mentioned above, the cart 500 includes a handle 512. The handle 512 includes first and second mount members 554, 556 connected to the cart chassis 508, and a user interface console 546 is connected to the first mount member 554. As shown in FIG. 26, the console 546 is movably connected to the mount member 556.

The console 546 is adjustable (e.g., pivotable about 90°) between a transport mode (see FIGS. 24-25), in which the console 546 is connected to the mount members 554, 556 and intersects the longitudinal plane P2, and a lift mode (shown in FIG. 26), in which the console 546 is not connected to at least one mount member (e.g., the mount member 556). As illustrated, in the lift mode, the console 546 does not intersect the longitudinal plane P2 and does not intersect a box defined parallel to the longitudinal centerline L1 and terminating up to the first and second mount members 554, 556. With the console 546 in the lift mode, elongated materials transported on the cart 500 can be lifted above the height of the handle 512. The console 546 can move between the transport mode and the lift mode in any appropriate manner.

FIGS. 27-31, illustrate another embodiment of a cart, such as a material transport cart 400. The cart 300 is similar to the cart 100, 200, 300, 400, 500 described above and shown in FIGS. 1-26. Features that are similar or identical to those discussed above may not be described in detail herein. Common elements have the same reference number plus "100" from the highest number for the element.

In the material transport cart 600, various components are connected to or housed within the cart body 608. For example, a lifting assembly (not shown) is operable to actuate a lifting arm 658 translatable relative to the cart body 608 between a lowered position (see FIGS. 27 and 29) and a lifted position (see FIG. 28).

Figure 27:
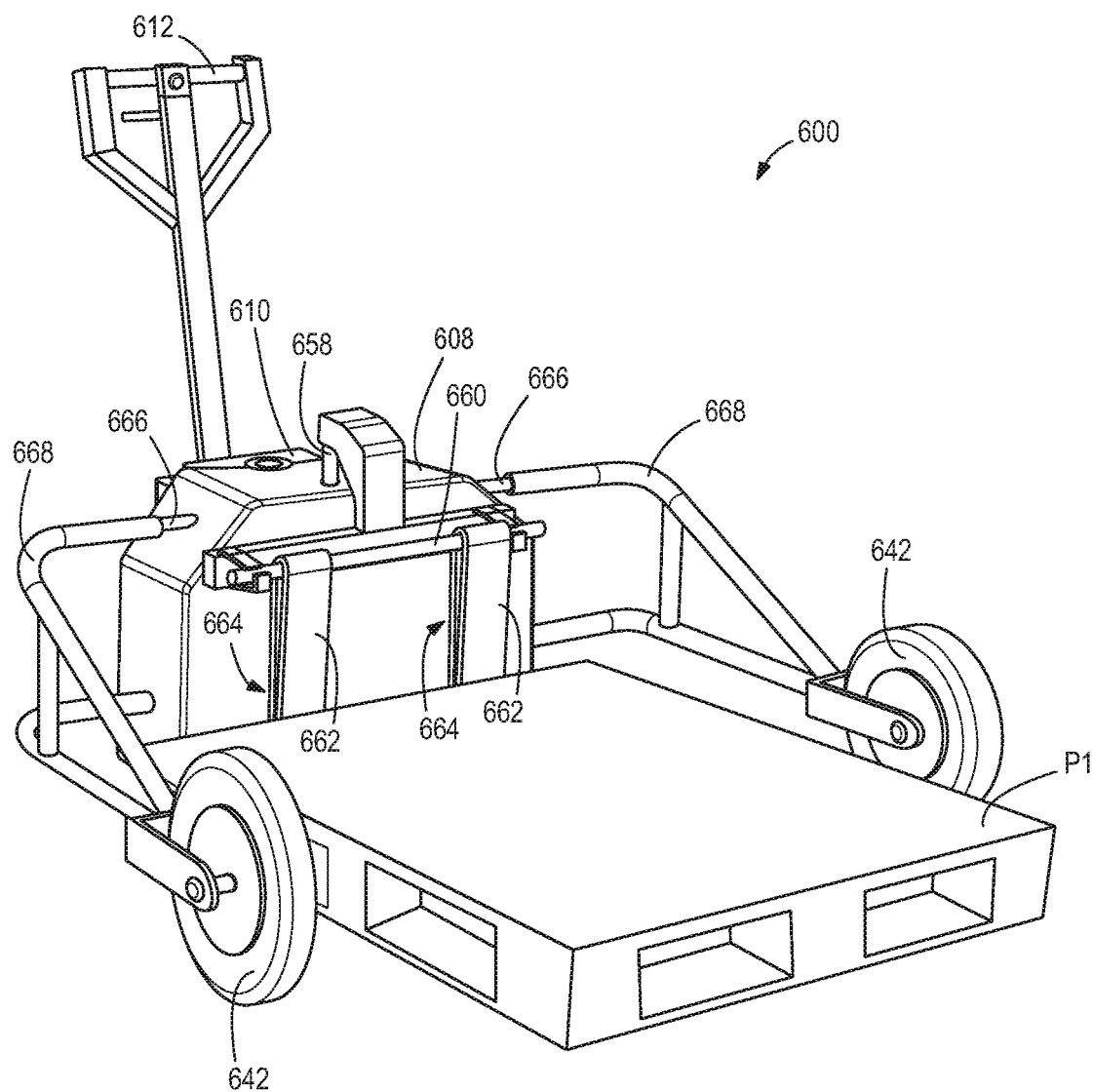
FIG. 27 is a perspective view of yet another material transport cart.
Figure 28:
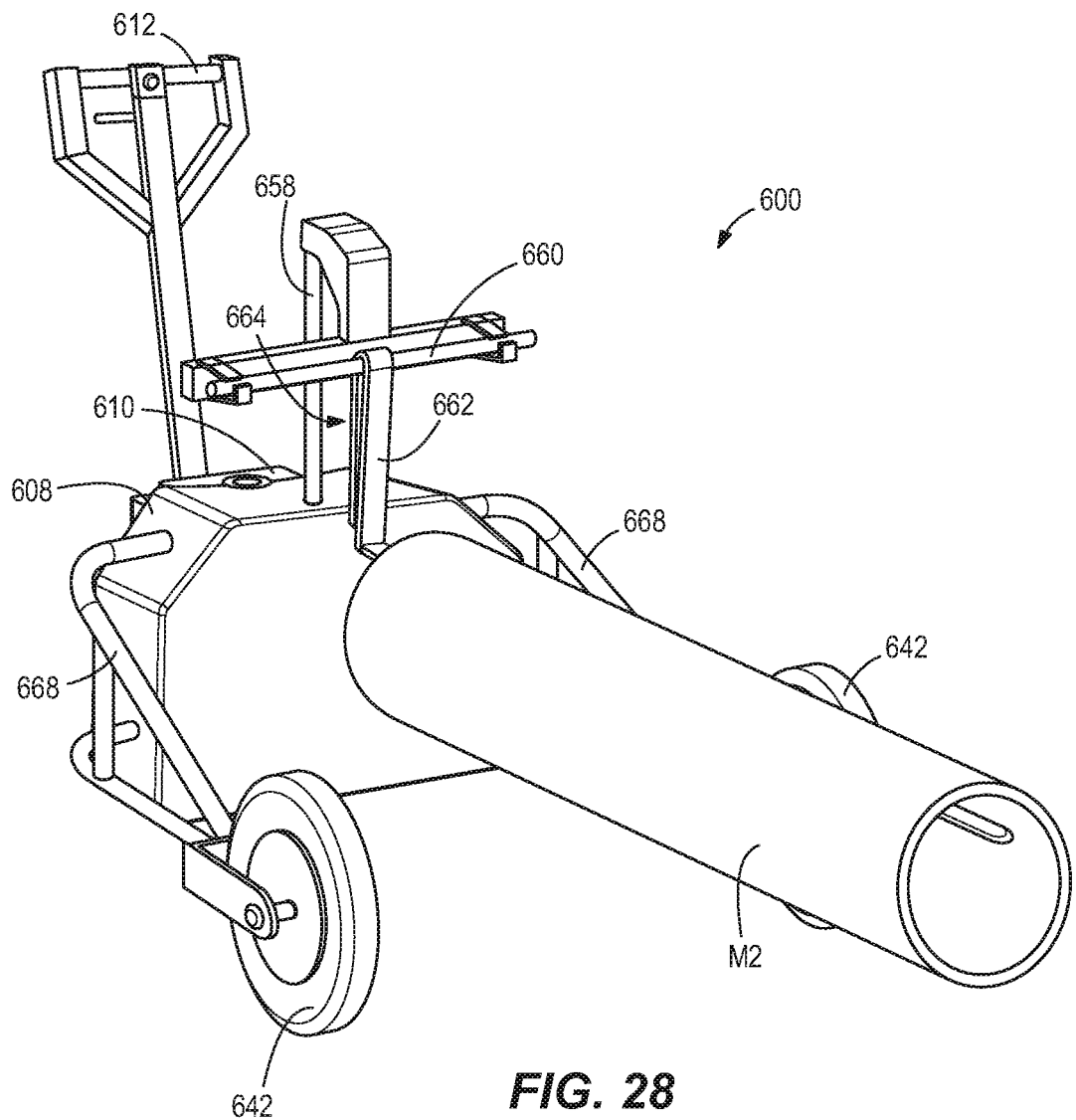
FIG. 28 is a perspective view of the material transport cart of FIG. 27, illustrating a single tine attachment connected to an attachment receiving portion of a lifting arm of the cart.
Figure 29:
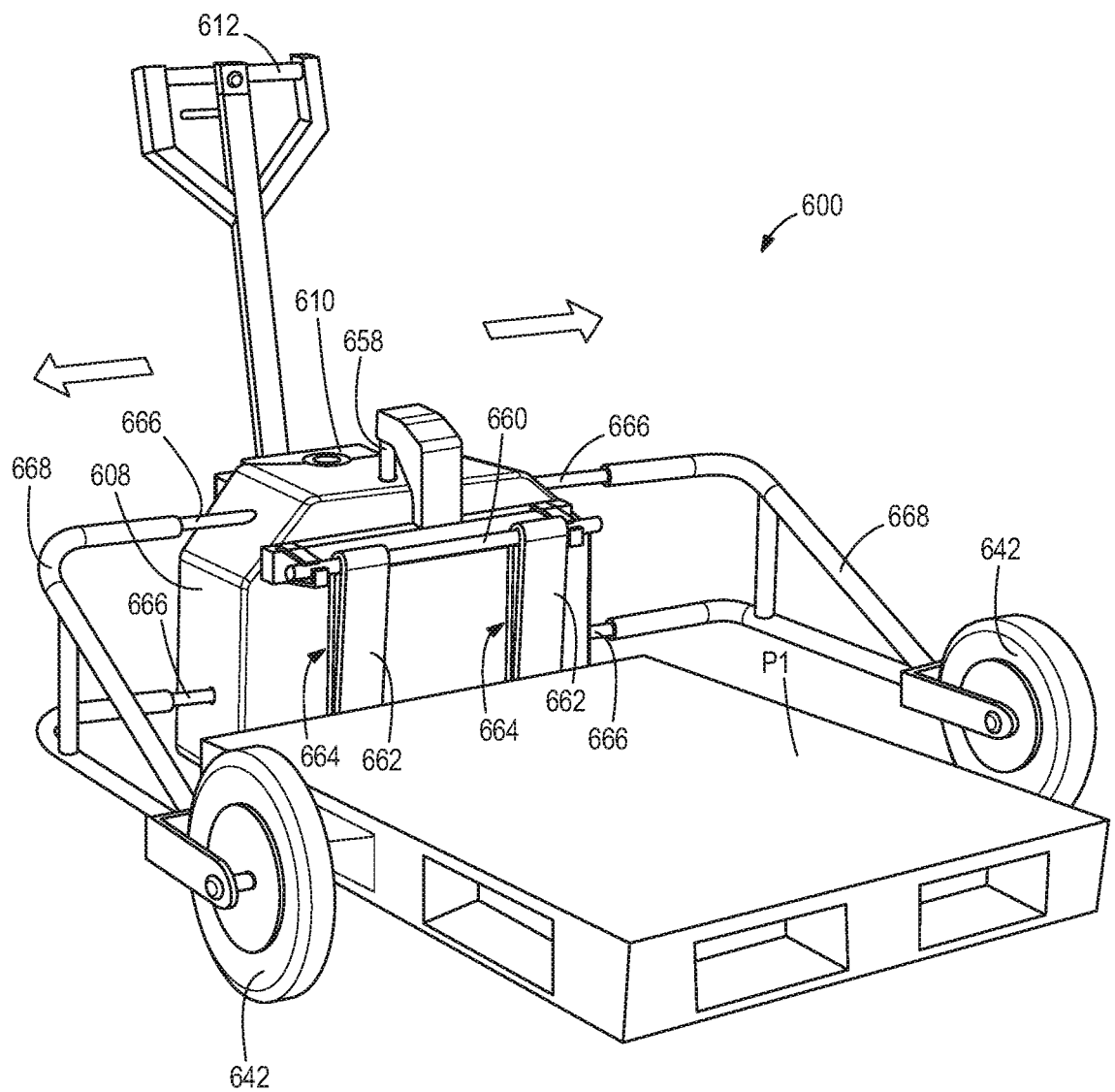
FIG. 29 is a perspective view of the material transport cart of FIG. 27, illustrating wheel frames and corresponding wheels in an expanded mode.
Figure 30:
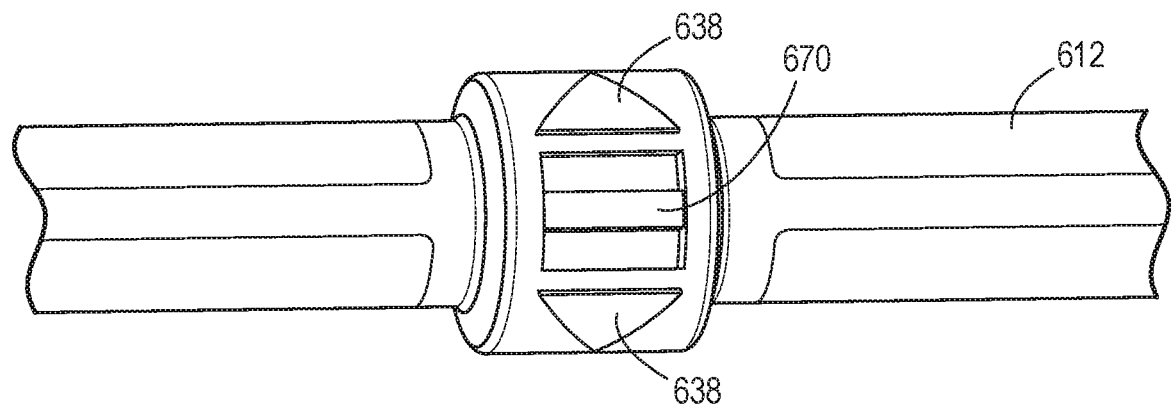
FIG. 30 is a plan view of user interface controls of the material transport cart of FIG. 27.
Figure 30A:
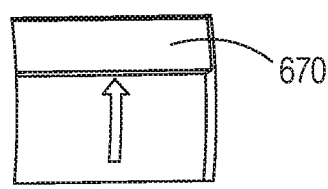
FIG. 30A is a plan view of a lift control of the user interface controls of FIG. 30, illustrating a raise command position.
Figure 30B:
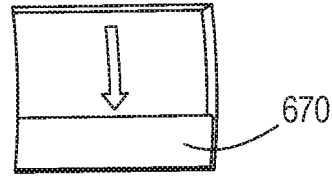
FIG. 30B is a plan view of the lift control of the user interface controls of FIG. 30, illustrating a lower command position.

An attachment receiving portion 660 is connected to an end of the lifting arm 658 opposite the cart body 608. The attachment receiving portion 660 may be removably connected to, a unitary and integral piece with, or have any another suitable configuration with the lifting arm 658. The attachment receiving portion 660 may have a connecting arrangement including, for example, a slot, a hook, a bar (as shown in FIGS. 27-29), a post, a recess, one or more bolts, one or more threaded openings, and the like.

A tine attachment 662 may be removably connected to the attachment receiving portion 660. The tine attachment 662 has a connecting arrangement complementary to the attachment receiving portion 660. For example, as shown in FIGS. 27-29, the tine attachment 662 has a slot 664 is configured to receive the bar of the attachment receiving portion 660. Stated another way, the attachment receiving portion 660 occupies the slot 664 when the tine attachment 662 is connected.

The tine attachment 662 contacts the cart body 608 to inhibit pivoting movement about the attachment receiving portion 660 toward the cart body 608. The slot 664 extends a majority of the vertical length of the tine attachment 662, and the back wall of the slot 664 contacts the cart body 608.

The tine attachment 662 may include one or more tines (not shown but similar to the tines 104, 106). For lifting an elongated material component (e.g., a pipe; see FIG. 28), the tine attachment 662 includes a single tine to be received in the component. For lifting pallets P1, the tine attachment 662 includes two spaced apart tines. The tines may be a single unitary piece with the tines connected to each other. Alternatively, each tine may form a separate tine attachments 662, each connectable to the attachment receiving portion 660.

Figure 31:
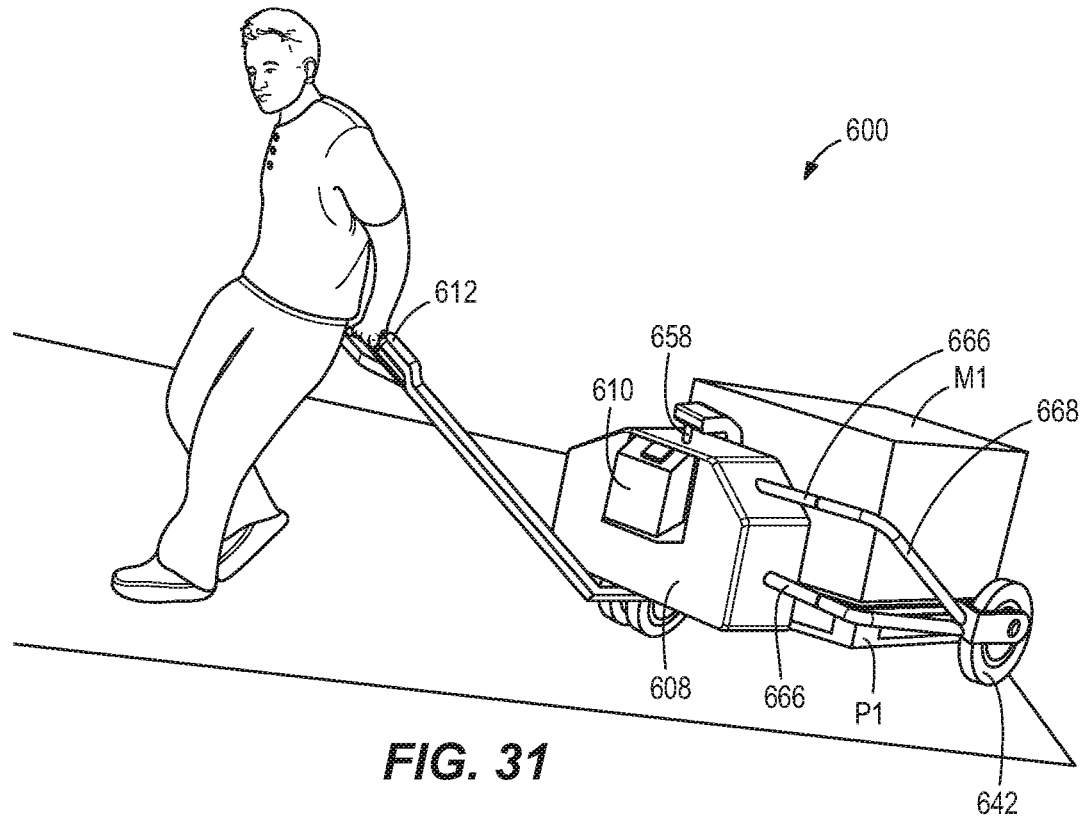
FIG. 31 is a perspective view of the material transport cart of FIG. 27, illustrating travel up an inclined surface.

As shown in FIGS. 27, 29, and 31, the cart 600 includes one or more width adjustment arms 666 adjustable transverse to the cart body 608 and the lifting direction of the lifting arm 658 to, for example, widen or narrow a wheel base of the cart 600. A width adjustment assembly (not shown) including an electric motor, a hydraulic actuator, etc., may be housed inside or connected to the cart body 608 to move the width adjustment arms 666. The width adjustment arm 666 on each side of the cart body 608 includes a wheel frame assembly 668 supporting a wheel 642.

In an alternative embodiment, the width adjustment arms 666 may simply be rigidly connected to the cart body 608 as attachment posts for the wheel frame assembly 668. The wheel frame assembly 668 may be translatable relative to the width adjustment arms 666 in a variety of ways, such as a telescoping relationship (see FIG. 29). The wheel frame assembly 668 could be secured at a particular distance from the cart body 608 with an appropriate mechanism such as a detent mechanism, a set screw, a clamp, a locking post, other fastener, etc.

In the illustrated embodiment, the handle 612 is similar to a traditional pallet jack handle. Cart movement controls 638, lifting arm adjustment controls 670, width adjustment controls (not shown), etc. are supported on the handle 612.

In some embodiments (not shown), the movement controls may include a potentiometer-type sensor to control forward and reverse movement, as well as speed (e.g., by pulse-width modulation), based on, for example, predetermined settings. The control may have detented settings or a continuous control. The cart may include a neutral mode in which the wheel drive can be disengaged by a user for manual movement.

The movement control may include feedback (e.g., a tachometer, a resolver, Hall sensor, etc.) dependent on the type of motor (e.g., a brushed motor, a brushless DC (BLDC) motor) or open loop control by the user.

Although particular independent embodiments have been described above, the above disclosure is not to be interpreted as limiting to the disclosed independent embodiments. A person having ordinary skill in the art, with the knowledge of this disclosure, may contemplate various alternative independent embodiments or additional features to disclosed independent embodiments that should be considered within the scope of the current disclosure. Additionally, one or more elements of one independent embodiment may be combined with elements of other independent embodiment(s) to create a new additional independent embodiment.

One or more independent features and/or independent advantages of the disclosure may be set forth in the following claims.

What is claimed is:

1. A material transport cart comprising:
   a cart body;
   a material support body coupled to the cart body;
   a wheel coupled to the cart body;
   a motor operable to drive the wheel;
   a powered lift assembly coupled to the cart body and to the material support body, the powered lift assembly operable to lift the material support body relative to the cart body;
   a removable battery electrically coupled to and operable to supply power to both the motor and the powered lift assembly; and
   a handle including
      a first mount member connected to the cart body,
      a second mount member connected to the cart body, and
      a user engagement portion pivotably connected to the first mount member and selectively connectable to the second mount member.

2. The material transport cart of claim 1, wherein
   the motor includes an electric motor; and
   the powered lift assembly includes a hydraulically operated powered lift assembly having an electrically powered hydraulic pump and a hydraulic lift cylinder.

3. The material transport cart of claim 1, wherein the material support body includes a first material support body section and a second material support body section hingedly connected to the first material support body section.

4. The material transport cart of claim 3, wherein the first material support body section and the second material support body section rotatably move from a flatbed mode to a material containment mode.

5. The material transport cart of claim 4, wherein the material containment mode includes the first material support body section and the second material support body section forming a generally concave material support surface.

6. The material transport cart of claim 4, wherein the material containment mode includes the first material support body section and the second material support body section forming a generally V-shaped support surface.

7. The material transport cart of claim 1, further comprising at least one material containment barrier pivotably connected to the material support body.

8. The material transport cart of claim 1, wherein the material support body defines a longitudinal centerline, and the user interface console is pivotally coupled to the first mount member about a pivot point lateral to the longitudinal centerline.

* * * * *